United States Patent
LeMay

(10) Patent No.: US 9,830,162 B2
(45) Date of Patent: Nov. 28, 2017

(54) TECHNOLOGIES FOR INDIRECT BRANCH TARGET SECURITY

(71) Applicant: Intel Corporation, Santa Clara, CA (US)

(72) Inventor: Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 14/570,507

(22) Filed: Dec. 15, 2014

(65) Prior Publication Data

US 2016/0170769 A1   Jun. 16, 2016

(51) Int. Cl.
*G06F 9/38* (2006.01)
*H04L 9/08* (2006.01)
(Continued)

(52) U.S. Cl.
CPC ........ *G06F 9/3863* (2013.01); *G06F 9/30043* (2013.01); *G06F 9/35* (2013.01);
(Continued)

(58) Field of Classification Search
CPC .. G06F 9/3004; G06F 9/30043; G06F 9/3005; G06F 9/30054; G06F 9/30058; G06F 9/30061; G06F 9/35; G06F 9/3857; G06F 9/3859; G06F 9/3861; G06F 9/3863; G06F 9/3865; G06F 9/3806; G06F 9/3844; G06F 9/3848; G06F 9/322; G06F 9/3804; G06F 9/3802; G06F 9/3842;
(Continued)

(56) References Cited

U.S. PATENT DOCUMENTS 5,890,217 A * 3/1999 Kabemoto .......... G06F 12/0817
                                                    711/120
7,644,210 B1 * 1/2010 Banning ............. G06F 9/45504
                                                    710/100

(Continued)

OTHER PUBLICATIONS

Pappas, V. et al., "Transparent ROP Exploit Mitigation Using Indirect Branch Tracing," USENIX Security, pp. 447-462, Aug. 2013.*

(Continued)

*Primary Examiner* — Techane Gergiso
(74) *Attorney, Agent, or Firm* — Barnes & Thornburg LLP

(57) ABSTRACT

Technologies for indirect branch target security include a computing device having a processor to execute an indirect branch instruction. The processor may determine an indirect branch target of the indirect branch instruction, load a memory tag associated with the indirect branch target, and determine whether the memory tag is set. The processor may generate a security fault if the memory tag is not set. The processor may load an encrypted indirect branch target, decrypt the encrypted branch target using an activation record key stored in an activation key register, and perform a jump to the indirect branch target. The processor may generate a next activation record coordinate as a function of the activation record key and a return address of a call instruction and generate the next activation record key as a function of the next activation record coordinate. Other embodiments are described and claimed.

11 Claims, 8 Drawing Sheets

(51) Int. Cl.
*G06F 9/30* (2006.01)
*G06F 12/14* (2006.01)
*G06F 12/12* (2016.01)
*G06F 9/35* (2006.01)

(52) U.S. Cl.
CPC .......... *G06F 12/12* (2013.01); *G06F 12/1408* (2013.01); *H04L 9/0861* (2013.01); *G06F 2212/1052* (2013.01); *G06F 2212/69* (2013.01)

(58) Field of Classification Search
CPC ...... G06F 9/3855; G06F 9/3808; G06F 12/12; G06F 12/1408; G06F 12/0891; G06F 12/0875; G06F 2212/1052; G06F 21/12; G06F 21/121; G06F 21/50; G06F 21/52; G06F 21/54; G06F 21/56; G06F 21/566; G06F 21/568; G06F 21/57; G06F 21/577; G06F 2212/69; H04L 9/0861; H04L 9/0825
See application file for complete search history.

(56) References Cited

U.S. PATENT DOCUMENTS

| | | | | |
|---|---|---|---|---|
| 7,809,898 | B1* | 10/2010 | Kiselev | G06F 11/2064 711/111 |
| 8,943,313 | B2* | 1/2015 | Glew | G06F 21/72 713/162 |
| 2004/0064668 | A1* | 4/2004 | Kjos | G06F 12/1027 711/202 |
| 2007/0106986 | A1* | 5/2007 | Worley, Jr. | G06F 9/45537 718/1 |
| 2008/0133858 | A1* | 6/2008 | Enbody | G06F 21/52 711/163 |
| 2008/0184016 | A1* | 7/2008 | Erlingsson | G06F 21/52 712/233 |
| 2008/0250216 | A1* | 10/2008 | Kershaw | G06F 9/322 711/163 |
| 2009/0089564 | A1* | 4/2009 | Brickell | G06F 9/30003 712/239 |
| 2011/0289300 | A1* | 11/2011 | Beaumont-Smith | G06F 9/3806 712/205 |
| 2011/0320786 | A1* | 12/2011 | Chen | G06F 9/3806 712/233 |
| 2011/0320787 | A1* | 12/2011 | Dieffenderfer | G06F 9/30003 712/234 |
| 2012/0198170 | A1* | 8/2012 | Chen | G06F 9/3806 711/125 |
| 2012/0297146 | A1* | 11/2012 | Guthrie | G06F 12/0815 711/141 |
| 2013/0022201 | A1* | 1/2013 | Glew | G06F 21/72 380/268 |
| 2013/0024676 | A1* | 1/2013 | Glew | G06F 9/30076 712/244 |
| 2013/0031364 | A1* | 1/2013 | Glew | G06F 21/72 713/162 |
| 2013/0036314 | A1* | 2/2013 | Glew | G06F 12/1408 713/194 |
| 2013/0036464 | A1* | 2/2013 | Glew | G06F 21/71 726/22 |
| 2013/0047255 | A1* | 2/2013 | Dalcher | H04L 63/20 726/23 |
| 2013/0254494 | A1* | 9/2013 | Oxford | G06F 12/1466 711/145 |
| 2014/0006752 | A1* | 1/2014 | Morrow | G06F 9/3848 712/205 |
| 2014/0372734 | A1* | 12/2014 | Greathouse | G06F 9/3005 712/237 |
| 2015/0006863 | A1* | 1/2015 | McGowan | G06F 11/3636 712/227 |
| 2015/0007142 | A1* | 1/2015 | Biffle | G06F 21/53 717/126 |
| 2015/0339480 | A1* | 11/2015 | Lutas | G06F 21/56 726/22 |
| 2015/0356294 | A1* | 12/2015 | Tan | G06F 8/427 726/22 |
| 2015/0363201 | A1* | 12/2015 | Eickemeyer | G06F 9/3806 712/239 |

OTHER PUBLICATIONS

Vasilis Pappask, "kBouncer: Efficient and Transparent ROP Mitigation," available at http://www.cs.columbia.edu/~vpappas/papers/kbouncer.pdf, Apr. 1, 2012 (8 pages).

Vasileios P. Kemerlis et al., "kGuard: Lightweight Kernel Protection Against Return-to-user Attacks," USENIX Security Symposium, Aug. 8-10, 2012 (16 pages).

Alex Bradbury et al., "Tagged Memory and Minion Cores in the lowRISC SoC," available at http://www.lowrisc.org/docs/memo-2014-001-tagged-memory-and-minion-cores/, Dec. 2014 (9 pages).

Mike Frantzen & Mike Shuey, "StackGhost: Hardware Facilitated Stack Protection," Proceedings of the 10th USENIX Security Symposium, Aug. 13-17, 2001 (12 pages).

Ali José Mashtizadeh et al., "Cryptographically Enforced Control Flow Integrity," arXiv:1408.1451 [cs], Aug. 7, 2014 (15 pages).

Jonathan Woodruff et al., "The CHERI Capability Model: Revisiting RISC in an Age of Risk," 2014 ACM/IEEE 41st International Symposium on Computer Architecture (ISCA), 2014, pp. 457-468 (12 pages).

"Glenford Myers," Wikipedia, The Free Encyclopedia, available at http://en.wikipedia.org/wiki/Glenford_Myers, edited Aug. 26, 2014 (6 pages).

Nickolai Zeldovich et al., "Hardware Enforcement of Application Security Policies Using Tagged Memory," Proceedings of the 8th USENIX Symposium on Operating Systems Design and Implementation (OSDI '08), Dec. 8-10, 2008 (17 pages).

Michael Lemay & Barry E. Huntley, unpublished U.S. Appl. No. 14/498,075, filed Sep. 26, 2014 (60 pages).

Ravi Sahita et al., unpublished U.S. Appl. No. 14/320,334, filed Jun. 30, 2014 (54 pages).

* cited by examiner

TECHNOLOGIES FOR INDIRECT BRANCH TARGET SECURITY

BACKGROUND

Return-oriented programming (ROP) exploits are an increasingly common form of malicious software (malware) that may circumvent certain defenses that mark locations of memory as non-executable. An ROP exploit works by stringing together a large number of existing segments of executable code that each end with a "return" instruction (known as gadgets). Each ROP gadget is typically short, and typically does not correspond to an existing procedure or even an existing instruction boundary in the executable code. The attacker constructs a malicious stack including a series of return addresses pointing to the desired sequence of gadgets. The ROP exploit is performed by causing the processor of the computer to execute software using the malicious stack instead of the legitimate system stack. For example, the malicious stack may be introduced by smashing the stack, using a buffer overflow exploit, pivoting to a new stack, or otherwise corrupting the system stack. Jump-oriented programming (JOP) exploits are similar, but target gadgets that end with an indirect jump instruction rather than a return instruction.

Certain ROP exploits may be prevented by maintaining a "shadow stack" in parallel with the ordinary system stack (also called the "legacy stack"). The shadow stack maintains a copy of the legacy stack in memory inaccessible to ordinary software, and may be used to determine if the legacy stack has been tampered with by malware. The shadow stack may be implemented using binary instrumentation, which introduces a significant performance slowdown for some usages. Technologies for protecting from ROP exploits using a shadow stack are further described in co-pending U.S. patent application Ser. No. 14/498,075, filed on Sep. 26, 2014, and entitled *Hardware Shadow Stack Support for Legacy Guests*.

Address space layout randomization (ASLR) is a security technique implemented by certain operating systems (e.g., Windows™, Linux™, and OS X®). ASLR may mitigate ROP and JOP exploits. However, separate memory disclosure attacks may be used by malware to bypass ASLR.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
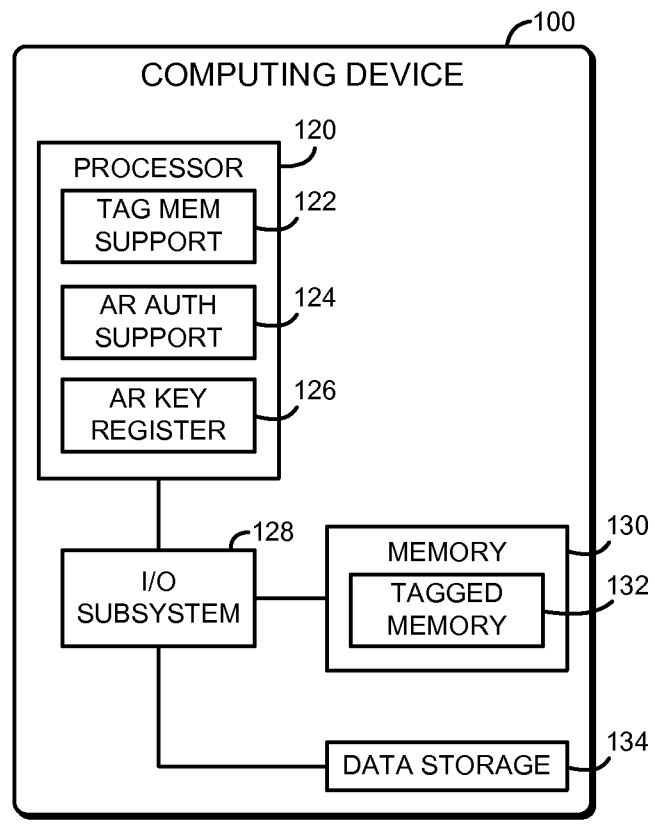
FIG. 1 is a simplified block diagram of at least one embodiment of a computing device for indirect branch target security.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for indirect branch target security includes a processor 120. In use, as described below, the computing device 100 may tag memory locations associated with indirect branch targets. During execution of an indirect branch instruction, the processor 120 may determine whether the indirect branch target is tagged. If not tagged, the processor 120 may generate a fault, interrupt, or other signal that may be handled by security software. The memory tags may be maintained by a combination of hardware of the processor 120 and privileged software, such as an operating system or hypervisor. As further described below, the computing device 100 may also securely authorize particular activation records to use particular indirect branch targets. An activation record, also known as a stack frame, corresponds to a particular invocation of a function. Each activation record may be identified using an activation record coordinate system that represents the activation record's ancestors in the system call stack (its lineage) and the return address of the activation record. During execution of an indirect branch instruction, the processor 120 may determine whether the indirect branch target is security bound to the current activation record; that is, whether the current activation record has been authorized to use that indirect branch target. If not authorized, the processor 120 may generate a fault, interrupt, or other signal that may be handled by security software. Authorizations may be created and delegated by a combination of hardware of the processor 120 and the privileged software. Tagging indirect branch targets and/or authorizing activation records to use indirect branch targets may prevent or reduce both return-oriented programming (ROP) and jump-oriented programming (JOP) exploits by only allowing indirect branches to predefined and/or authorized locations in code. Additionally, authorizing particular activation records may further prevent unauthorized control flow, for example by only allowing certain invocations of a function to access a particular indirect branch target.

The computing device 100 may be embodied as any type of device capable of performing the functions described herein. For example, the computing device 100 may be embodied as, without limitation, a computer, a desktop computer, a workstation, a server computer, a laptop computer, a notebook computer, a tablet computer, a smartphone, a mobile computing device, a wearable computing device, a distributed computing system, a multiprocessor system, a consumer electronic device, a smart appliance, and/or any other computing device capable of providing shadow stack support. As shown in FIG. 1, the illustrative computing device 100 includes the processor 120, an I/O subsystem 128, a memory 130, and a data storage device 134. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. The processor 120 includes tagged memory support 122. The tagged memory support 122 may be embodied as any hardware, microcode, firmware, or other components of the processor 120 capable of accessing and/or other otherwise maintaining memory tags associated with addresses in the main memory 130. As further described below, the tagged memory support 122 may include processor instructions or other hardware commands to manage the memory tags. The tagged memory support 122 may also include indirect branch processor instructions or other commands that automatically access and/or manage the memory tags (e.g., jump, call, return, or other indirect branch instructions).

The processor 120 further includes activation record authorization support 124 and an activation record key register 126. The activation record authorization support 124 may be embodied as any hardware, microcode, firmware, or other components of the processor 120 capable of authorizing particular activation records to use particular indirect branch targets, as described below. The activation record authorization support 124 may, for example, securely bind particular indirect branch targets to a particular activation record, which may be identified by an activation record coordinate. The activation record authorization support 124 may include processor instructions or other hardware commands to authorize activation records to use indirect branch targets. The activation record authorization support 124 may include indirect branch processor instructions or other hardware commands that automatically verify and/or manage authorizations. The activation record key register 126 may embodied as any register, memory location, or other storage space capable of storing an activation record key corresponding to the current activation record. For example, the activation record key register 126 may be embodied as a 16-bit register.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. Additionally, the memory 130 includes tag memory 132. The tag memory 132 may include tag bits or other data cells associated with addresses in the main memory 130. The tag memory 132 may be associated with part or all of the memory 130. For example, in some embodiments certain memory pages may be capable of storing memory tags. As described above, in some embodiments the tag memory 132 may be accessed and otherwise managed by dedicated hardware of the processor 120, such as the tagged memory support 122. Additionally or alternatively, in some embodiments, part of the main memory 130 may be reserved and used as the tag memory 132. The tag memory 132 may not be accessible to unprivileged software executed by the computing device 100.

The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the computing device 100, on a single integrated circuit chip. The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may store memory tags when swapped out of tag memory 132.

In some embodiments, the computing device 100 may also include one or more peripheral devices 136. The peripheral devices 136 may include any number of additional input/output devices, interface devices, and/or other peripheral devices. For example, in some embodiments, the peripheral devices 136 may include a display, touch screen, graphics circuitry, keyboard, mouse, speaker system, and/or other input/output devices, interface devices, and/or peripheral devices.

Figure 2:
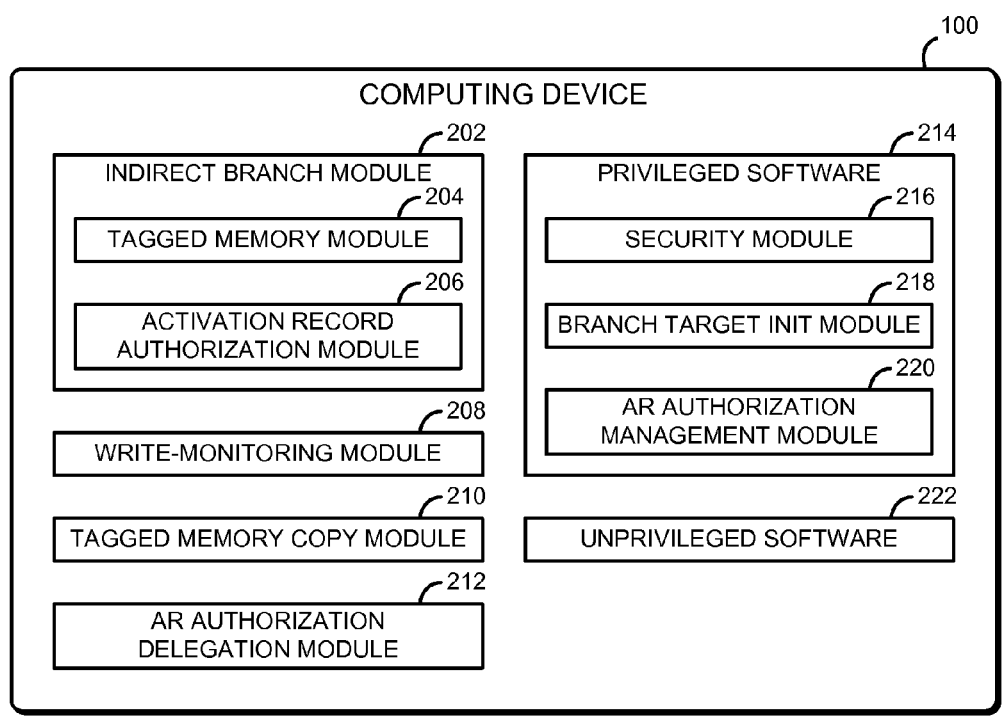
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes an indirect branch module 202, a write-monitoring module 208, a tagged memory copy module 210, an activation record authorization delegation module 212, privileged software 214, and unprivileged software 222. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., an indirect branch circuit, a write-monitoring circuit, etc.).

The indirect branch module 202 is configured to execute an indirect branch instruction, such as a jump, call, or return instruction. In some embodiments, during execution, the indirect branch module 202 may check if the indirect branch target of the indirect branch instruction has been tagged in the tag memory 132. If not, the indirect branch module 202 may generate a fault to be handled by the privileged software 214 as described below. The indirect branch module 202 may also manage memory tags in the tag memory 132 during execution of the indirect branch instruction, for example setting the memory tag for a return address during a call instruction and clearing the memory tag for the return address in a return instruction. In some embodiments, during execution the indirect branch module 202 may check if the current activation record is authorized to use the indirect branch target. If not, the indirect branch module 202 may generate a fault to be handled by the privileged software 214 as described below. The indirect branch module 202 may also manage activation record authorization during execution of the indirect branch instruction, for example pushing encrypted activation record coordinates onto the system call stack during a call instruction and decrypting the encrypted activation record coordinates in a return instruction. In some embodiments, those functions may be performed by submodules, such as a tagged memory module 204 and/or an activation record authorization module 206.

The write-monitoring module 208 is configured to monitor locations within the main memory 130 that are associated with the tag memory 132, and to clear the associated memory tags in response to writes to those locations in the main memory 130. The tagged memory copy module 210 is configured to copy data within the memory 130 and to also copy the associated memory tags within the tag memory 132. Thus, the write-monitoring module 208 and the tagged memory copy module 210 may allow the computing device 100 to maintain the consistency of the tag memory 132 and the main memory 130.

The activation record authorization delegation module 212 is configured to allow an activation record to delegate one or more of its current authorizations to a child activation record. The parent activation record may identify the authorized indirect branch target as well as the return address of the child activation record. The activation record authorization delegation module 212 may decrypt an encrypted indirect branch target using the parent activation record key, determine the child activation record key, and then re-encrypt the indirect branch target using the child activation record key.

The privileged software 214 may be embodied as any operating system, virtual machine monitor, hypervisor, or other privileged software component of the computing device 100. The privileged software 214 may protect part of the memory 130 from access by the unprivileged software 222. For example, in some embodiments, the tag memory 132 may be stored in the main memory 130, and the privileged software 214 may protect the tag memory 132 from being accessed by the unprivileged software 222. The privileged software 214 establishes a security module 216, a branch target initialization module 218, and an activation record authorization management module 220.

The security module 216 is configured to perform one or more security operations in response to a fault or other signal generated by the indirect branch module 202. For example, the privileged software 214 may terminate one or more processes of the unprivileged software 222, log a security violation, notify one or more users, and/or perform any other appropriate security operation. In some embodiments, the computing device 100 may perform one or more heuristic checks to determine whether the fault resulted from malicious software or from legitimate software. Additionally, although illustrated as being established in the privileged software 214, in other embodiments the processor 120 may generate an interrupt or other mechanism of invoking security software at the same privilege level as the unprivileged software 222.

The branch target initialization module 218 is configured to determine when indirect branch targets are initialized and to set memory tags for the indirect branch targets in the tag memory 132. For example, the branch target initialization module 218 may set a memory tag for the entry point for a function, a method, a procedure, a case block of a switch statement, or any other valid code block.

The activation record authorization management module 220 is configured to authorize particular activation records to use particular indirect branch targets. The activation record authorization management module 220 may encrypt the indirect branch target using the activation record key of the authorized activation record. The activation record authorization management module 220 may be capable of determining the activation record key for any activation record with high probability by searching the system call stack.

The unprivileged software 222 may be embodied as any application, process, thread, guest virtual machine, guest operating system, or other software that may be managed or controlled by the privileged software 214. The unprivileged software 222 may execute one or more indirect branch instructions using the indirect branch module 202. The unprivileged software 222 may or may not be allowed to directly access the tag memory 132 or the activation record key register 126.

Figure 3:
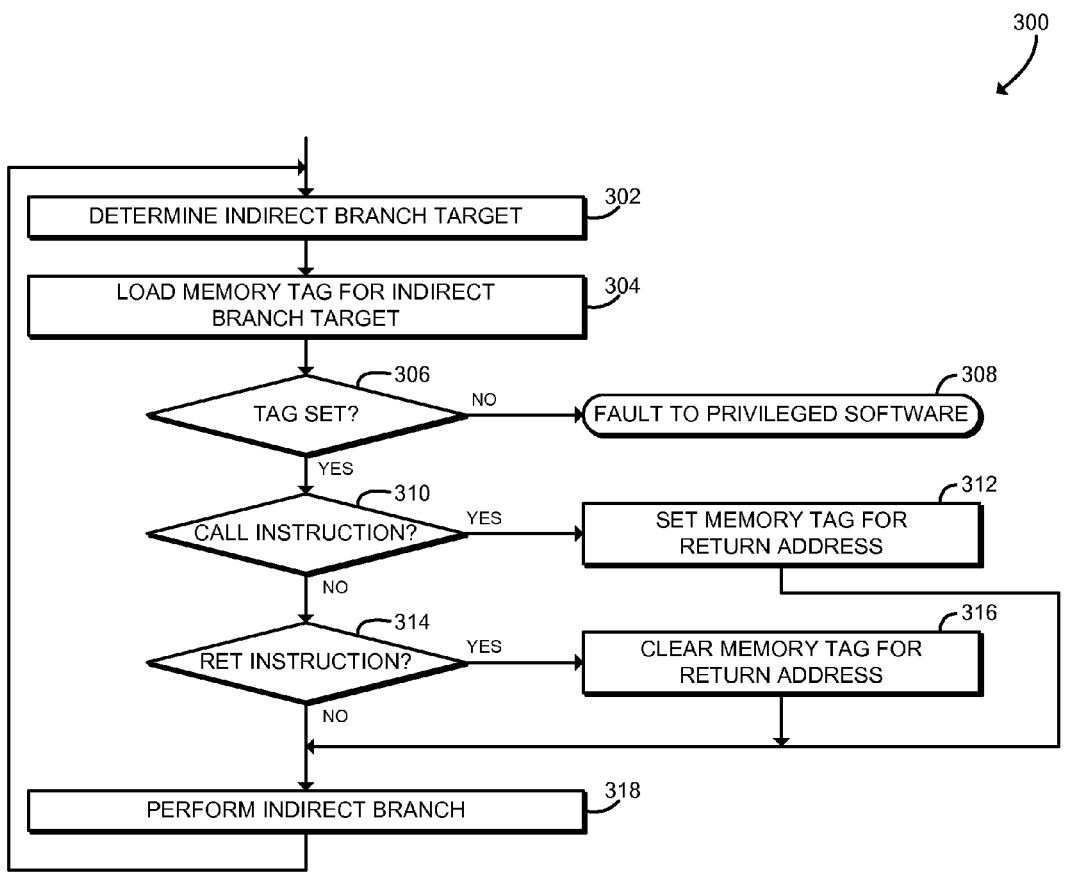
FIG. 3 is a simplified flow diagram of at least one embodiment of a method for executing an indirect branch instruction with tagged memory that may be executed by the computing device of FIGS. 1 and 2.

Referring now to FIG. 3, in use, the computing device 100 may execute a method 300 for executing an indirect branch instruction with tagged memory. The indirect branch instruction may be embodied as any instruction causing a change of control flow that depends on a variable value such as a memory location or a register, for example a conditional jump instruction, unconditional jump instruction, call instruction, or return instruction. The method 300 may be executed by hardware of the processor 120, such as by the tagged memory support 122. The method 300 begins in block 302, in which the computing device 100 determines the indirect branch target of the indirect branch instruction. The indirect branch target corresponds to a memory address of the next instruction to be executed by the processor 120 (i.e., a new instruction pointer value for the processor 120). The computing device 100 may determine the indirect branch target by loading data from a memory location that holds the indirect branch target, loading data from a register that holds the indirect branch target, performing an arithmetic operation, or any combination of those operations.

In block 304, the computing device 100 loads a memory tag corresponding to the indirect branch target holder. The memory tag may be embodied as any bit, binary value, or other value associated with an address in the memory 130 and capable of being "set" and "cleared." The memory tag may be associated with the indirect branch target holder; that is, the location in the memory 130 or the register that holds the indirect branch target. The memory tag may be stored in the tag memory 132 or in a tag register of the processor 120. Techniques for loading the memory tag are further described below in connection with FIG. 4.

In block 306, the computing device 100 determines if the memory tag associated with the indirect branch target holder is set. The computing device 100 may determine, for example, if the memory tag equals a binary "1" or "true" value, or may determine whether a memory tag exists at all for the indirect branch target. If the memory tag is set, the method 300 advances to block 310, described below. If the memory tag is not set, the method 300 branches to block 308.

In block 308, the computing device 100 generates a fault to the privileged software 214. The fault may be embodied as any interrupt, exception, fault, VMexit, hypercall, system call, or other signal that may be received by or otherwise handled by the privileged software 214. In response to handling the fault, the privileged software 214 may perform one or more security operations. For example, the privileged software 214 may terminate unprivileged software executed by the computing device 100, log a security violation, notify one or more users, and/or perform any other appropriate security operation. In some embodiments, the computing device 100 may perform one or more heuristic checks to determine whether the attempted branch using an untagged indirect branch target holder was caused by malicious software or by some legitimate software. For example, the computing device 100 may perform one or more heuristic checks as described in the co-pending U.S. patent application Ser. No. 14/498,075, Hardware Shadow Stack Support for Legacy Guests. Additionally, although illustrated as generating a fault to the privileged software 214, in other embodiments the processor 120 may generate an interrupt or other mechanism of invoking security software at the same privilege level as the software being protected. After faulting to privileged software, the method 300 is completed.

Referring back to block 306, if the memory tag is set for the indirect branch target holder, the method 300 advances to block 310, in which the computing device 100 determines whether the current indirect branch instruction is a call instruction. If the current indirect branch instruction is not a call instruction, the method 300 advances to block 314, described below. If the current indirect branch instruction is a call instruction, the method 300 branches to block 312.

In block 312, the computing device 100 sets a memory tag associated with the return address pushed on the stack by the current indirect branch instruction. The return address may be, for example, the next instruction following the indirect branch instruction. For typical call instructions, the indirect branch target corresponds to the entry point of a function, method, or other procedure, and the return address is different from the indirect branch target. Setting the memory tag for the memory location on the system stack that includes the return address indicates that the return address is a valid destination for an indirect branch instruction (e.g., a return instruction from the called procedure). Techniques for setting the memory tag are described further below in connection with FIG. 4. After setting the memory tag, the method 300 proceeds to block 318, described below.

Referring back to block 310, if the current indirect branch instruction is not a call instruction, the method 300 advances to block 314, in which the computing device 100 determines whether the current indirect branch instruction is a return instruction (e.g., a RET instruction). If the current indirect branch instruction is not a return instruction, the method 300 advances to block 318, described below. If the current indirect branch instruction is a return instruction, the method 300 branches to block 316.

In block 316, the computing device 100 clears the memory tag associated with the indirect branch instruction, which corresponds to the return address stored on the system stack. Clearing the memory tag enforces call-return semantics by allowing only a single return for each call instruction. That is, clearing the memory tag associated with the memory location that includes the return address may prevent repeated attempts to branch to the same return address. Techniques for clearing the memory tag are described further below in connection with FIG. 4. After setting the memory tag, the method 300 proceeds to block 318.

In block 318, the computing device 100 performs the indirect branch by jumping to the indirect branch target determined earlier. The computing device 100 may, for example, replace an instruction pointer value with the indirect branch target. After performing the indirect branch, the method 300 loops back to block 302 to continue executing indirect branch instructions.

Figure 4:
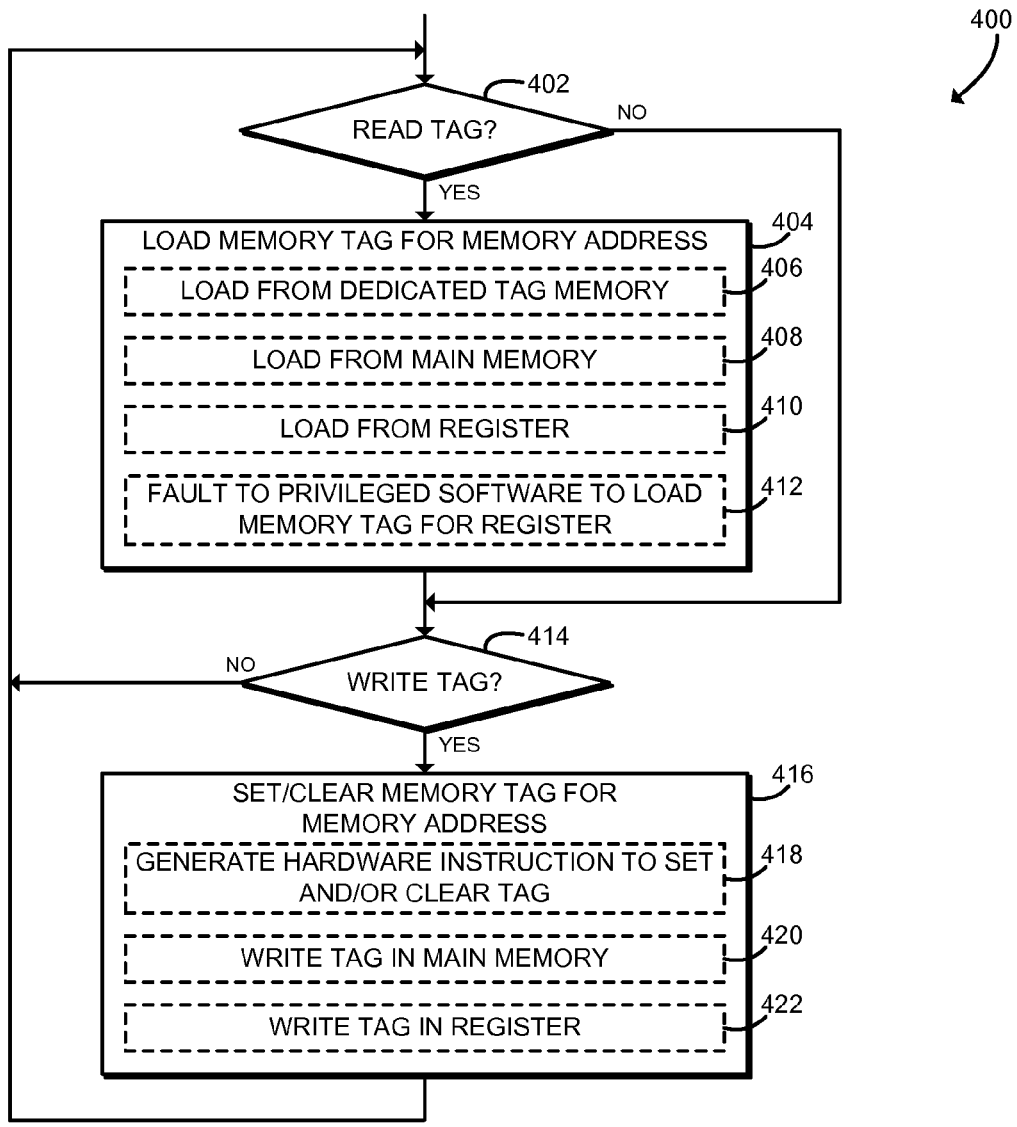
FIG. 4 is a simplified flow diagram of at least one embodiment of methods for accessing memory tags that may be executed by the computing device of FIGS. 1 and 2.

Referring now to FIG. 4, in use, the computing device 100 may execute a method 400 for accessing the tag memory 132. The method 400 may be executed, for example, when reading, setting, and/or clearing memory tags in the tag memory 132 during execution of the method 300 of FIG. 3, described above. The method 400 begins in block 402, in which the computing device 100 determines whether to read a memory tag. The computing device 100 may read one or more memory tags when determining whether to allow a branch to an indirect branch target, as described above in connection with block 304 of FIG. 3. If the computing device 100 determines not to read a memory tag, the method 400 branches to block 414, described below. If the computing device 100 determines to read a memory tag, the method 400 advances to block 404.

In block 404, the computing device 100 loads a memory tag corresponding to the specified memory address, for example a memory location holding an indirect branch target. The computing device 100 may perform any appropriate hardware and/or software operations to load the memory tag from the tag memory 132. As described above, the memory tag may be embodied as any bit, binary value, or other value associated with a location in the main memory 130 and capable of being "set" or "cleared." For example, the memory tag may be embodied as a binary "true/false" value. As another example, in some embodiments, the memory tag may exist for the specified memory address if set, and may not exist for the specified memory address if cleared. The memory tag may be loaded automatically by hardware of the processor 120, such as by the tagged memory support 122. For example, when loading a value from the specified memory address in the main memory 130, the tagged memory support 122 may automatically load the corresponding memory tag. Additionally or alternatively, in some embodiments the memory tag may be loaded by the privileged software 214 of the computing device 100.

In some embodiments, in block 406 the computing device 100 may load the memory tag from the dedicated tag memory 132. The computing device 100 may, for example, generate a specialized processor instruction or other command to load the tag from the tag memory 132.

In some embodiments, in block 408 the computing device 100 may load the memory tag from a part of the main memory 130 that has been reserved for memory tags. As described above, in those embodiments the memory tags may not be accessible to unprivileged software 222. When tags are stored in a part of the main memory 130, a mapping may be defined from the addresses of memory locations being tagged (i.e. memory locations that hold indirect branch targets and/or return addresses) to the location in the tag memory that contains the applicable tags. For example, that mapping may be a direct offset into the tag memory that is computed based on the offset of the linear address, guest physical address, or host physical address of the memory location being tagged. The latter offset may be relative to 0, some other base address, or the base address of the containing unit of memory, such as the beginning of a page.

In some embodiments, there also may exist one or more techniques to specify where the tag memory is located in the main memory 130. For example, a model-specific register (MSR) or other configuration register may specify a base address and size for the tag memory. For example, the base address may be specified as a linear address, guest physical address, or host physical address. The MSR or other configuration register may or may not be accessible to unprivileged software 222, depending on the capabilities of the computing device 100 (e.g. MSRs may only be accessed by privileged software 214 on a computing device using the Intel® IA-32 architecture). Additionally or alternatively, in some embodiments the computing device 100 may reference the tag memory for a particular unit of memory (such as a page) using a structure that is indexed by the linear, guest physical, or host physical address of the memory unit being tagged. A page table may be an example of such a structure.

In some embodiments, in block 410 the computing device 100 may load the memory tag from a register of the processor 120. For example, when loading data from the specified address in the main memory 130, the processor 120 may automatically load the associated memory tag into a register. That register may be embodied as a dedicated tag register that is not accessible to the unprivileged software 222. In some embodiments, in block 412 the computing device 100 may generate a fault to the privileged software 214 to load the memory tag associated with a particular register. For example, the register may include an indirect branch target value that has been calculated and not loaded directly from the main memory 130. In those embodiments, the privileged software 214 may load the memory tag associated with the indirect branch target stored in the register from the tag memory 132, or may compute an appropriate tag value in some other way.

In block 414, the computing device 100 determines whether to write a memory tag for a specified memory address to the tag memory 132. The computing device 100 may write the memory tag in response to a command to set and/or clear the memory tag as described above in connection with FIG. 3. The computing device 100 may also write the memory tag when a location in the main memory 130 associated with the memory tag is modified. If the computing device 100 determines not to write a memory tag, the method 400 loops back to block 402 to continue accessing the tag memory 132. If the computing device 100 determines to write a memory tag, the method 400 advances to block 416.

In block 416, the computing device 100 sets and/or clears the memory tag corresponding to the specified memory address. The computing device 100 may perform any appropriate hardware and/or software operations to set or clear the memory tag in the tag memory 132. In some embodiments, a location in the tag memory 132 may not exist for each byte of the memory 130 being tagged. For example, in some embodiments, a single tag may apply to a 4-byte or 8-byte region of the memory 130. Thus, in some embodiments a rule, policy, or other convention may establish what tag bits are set to authorize a memory location to hold an indirect branch target and/or return address. For example, in some embodiments the computing device 100 may require that the tag memory location correspond to the address of the first byte of the memory location holding the authorized indirect branch target or return address be tagged. In embodiments in which a single tag applies to a multibyte region of the memory 130, that first byte location may be required to be naturally aligned to a boundary corresponding to the number of bytes that are covered by a single tag. In some embodiments, for example for legacy compatibility with addresses that do not satisfy that criteria, the surrounding tags may be left unset so that a fault to the privileged software 214 and/or the unprivileged software 222 if allowable may be generated to provide that software 214, 222 with an opportunity to determine whether that indirect branch target and/or return address is authorized.

In some embodiments, in block 418 the computing device 100 may generate a hardware command to set or clear the tag in the tag memory 132 such as a specialized processor instruction or other command. In those embodiments, the tag may be set or cleared by hardware of the processor 120, such as the tagged memory support 122. For example, the processor 120 may execute a specialized processor instruction and/or write to a separate memory-mapped range for managing the tag memory 132. As another example, the computing device 100 may set hardware bounds of the processor 120 to identify a region of the memory 130 as tagged.

In some embodiments, in block 420, the computing device 100 may set or clear the tag by writing to the main memory 130. In those embodiments, the tag memory 132 may be embodied as a part of the main memory 130 that may or may not be accessible by the unprivileged software 222. In some embodiments, in block 422 the computing device 100 may set or clear a tag stored in a register of the processor 120. For example, a memory tag associated with a data register may be cleared if the data register is modified. After setting and/or clearing the memory tag, the method 400 loops back to block 402 to continue accessing the tag memory 132. Although illustrated as sequentially determining whether to read and/or write the memory tag, it should be understood that those operations may be performed by the computing device 100 in any order and in response to appropriate commands or other events, as described above in connection with FIG. 3 and below in connection with FIG. 5.

Figure 5:
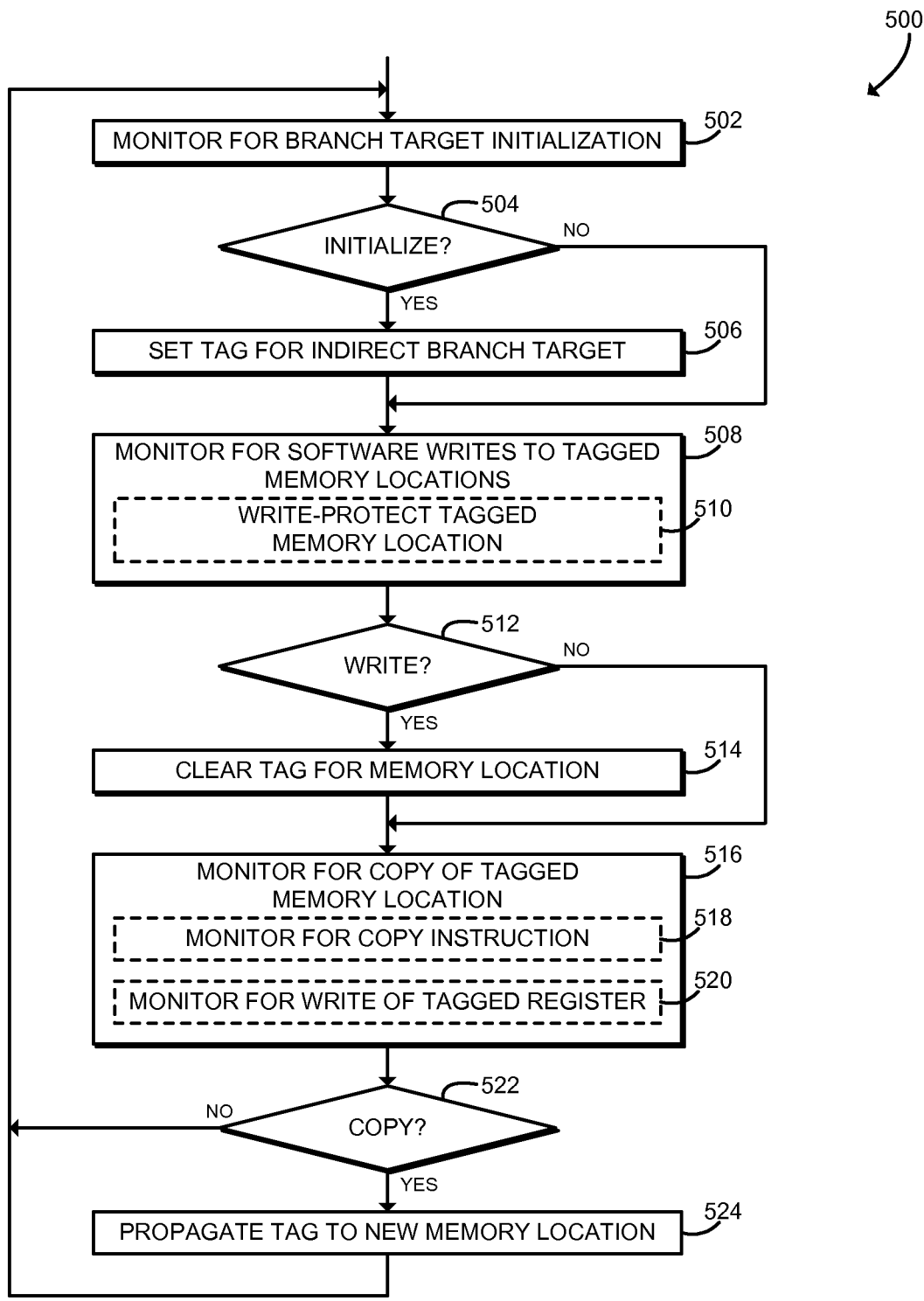
FIG. 5 is a simplified flow diagram of at least one embodiment of a method for managing tagged memory that may be executed by the computing device of FIGS. 1 and 2.

Referring now to FIG. 5, in use, the computing device 100 may execute a method 500 for managing the tag memory 132. The method 500 may be executed by the privileged software 214, by the processor 120, or by any appropriate combination of hardware and software of the computing device 100. In some embodiments, the method 500 may be executed by the unprivileged software 222, if allowable. The method 500 begins in block 502, in which the computing device 100 monitors for initialization of an indirect branch target holder in the memory 130. The indirect branch target holder may correspond to any memory location holding a valid entry point for executable code, and may be embodied as, for example, a memory location holding the entry point for a function, a method, a procedure, a case block of a switch statement, or any other valid code block. The indirect branch target holder may be initialized, for example, by loading an executable program, loading a dynamic library, opening or resolving a function, setting a variable (e.g., setting the control variable of a switch statement), or otherwise enabling a valid entry point for executable code. Monitoring for initialization may be performed by, for example, the privileged software 214 of the computing device 100 or the unprivileged software 222 of the computing device 100 if allowable. In block 504, the computing device 100 determines whether an indirect branch target is being initialized. If not, the method 500 branches ahead to block 508, described below. If an indirect branch target is being initialized, the method 500 advances to block 506.

In block 506, the computing device 100 sets a memory tag in the tag memory 132 corresponding to the indirect branch target holder. Setting the memory tag indicates that the memory location holds a valid indirect branch target. In some embodiments, in block 508, the computing device 100 may swap a memory page including the indirect branch target holder into the tag memory 132. For example, the tag memory 132 may not include sufficient storage to include tags for all possible indirect branch target holders. In those embodiments, the privileged software 214 may manage the limited amount of tag memory 132 by swapping pages including indirect branch target holders into and out of the tag memory 132. In some embodiments, the privileged software 214 may compress the memory tags when swapping out of the tag memory 132; compression of typically sparse tags may substantially reduce storage requirements. The computing device 100 may set the memory tag as described above in connection with block 416 of FIG. 4.

In block 508, the computing device 100 monitors for writes to tagged memory locations. The tagged memory location may include locations in the main memory 130 associated with a memory tag or registers of the processor 120 associated with a memory tag. A write to a tagged memory location may indicate that the tagged memory location no longer holds a valid indirect branch target. In some embodiments, the computing device 100 may monitor for writes using hardware of the processor 120, such as the tagged memory support 122. For example, the tagged memory support 122 may automatically detect writes to locations in the main memory 130 that are associated with memory tags in the tag memory 132, or may detect instructions that modify a register that is associated with a memory tag. Additionally or alternatively, in some embodiments, in block 510 the computing device 100 may write-protect the tagged memory location, for example by setting permissions in a memory page table or extended page table associated with tagged memory location in the main memory 130. In those embodiments, the privileged software 214 may monitor for writes to the tagged memory location by monitoring for memory faults generated in response to writes to the write-protected memory location. In block 512, the computing device 100 determines whether a write has been detected. If not, the method 500 branches ahead to block 516. If a write has been detected, the method 500 advances to block 514, in which the computing device 100 clears the memory tag associated with the modified memory location. The computing device 100 may clear the memory tag as described above in connection with block 416 of FIG. 4.

In block 516, the computing device 100 monitors for a copy of a tagged memory location. The computing device 100 may monitor for copies of tagged memory locations using any appropriate combination of hardware or software such as tagged memory support 122 and/or the privileged software 214. In some embodiments, in block 518 the computing device 100 may monitor for a specialized processor instruction or other command to copy a tagged memory location, for example using the tagged memory support 122. Additionally or alternatively, in some embodiments, in block 520 the computing device 100 may monitor writes to the main memory 130 from a register of the processor 120 that is associated with a memory tag. In block 522, the computing device 100 determines whether a copy was detected. If no copy was detected, the method 500 loops back to block 502 to continue managing the tag memory 132. If a copy was detected, the method 500 advances to block 524.

In block 524, the computing device 100 propagates the memory tag from its source to a new location in the tag memory 132. The computing device 100 may use any combination of hardware and software to copy the memory tag. For example, the computing device 100 may directly copy the data in the main memory 130 and the memory tag in the tag memory 132. As another example, the computing device 100 may load data from the main memory 130 into a register and load the associated memory tag from the tag memory 132 into an associated tag register. Continuing that example, when the data is stored from the register to the new location in the memory 130, the computing device 100 may also store the memory tag into the tag memory 132. The computing device 100 may read the memory tag value and write the memory tag value as described above in connection with FIG. 4. After propagating the tag, the method 500 loops back to block 502 to continue managing the tag memory 132.

Figure 6:
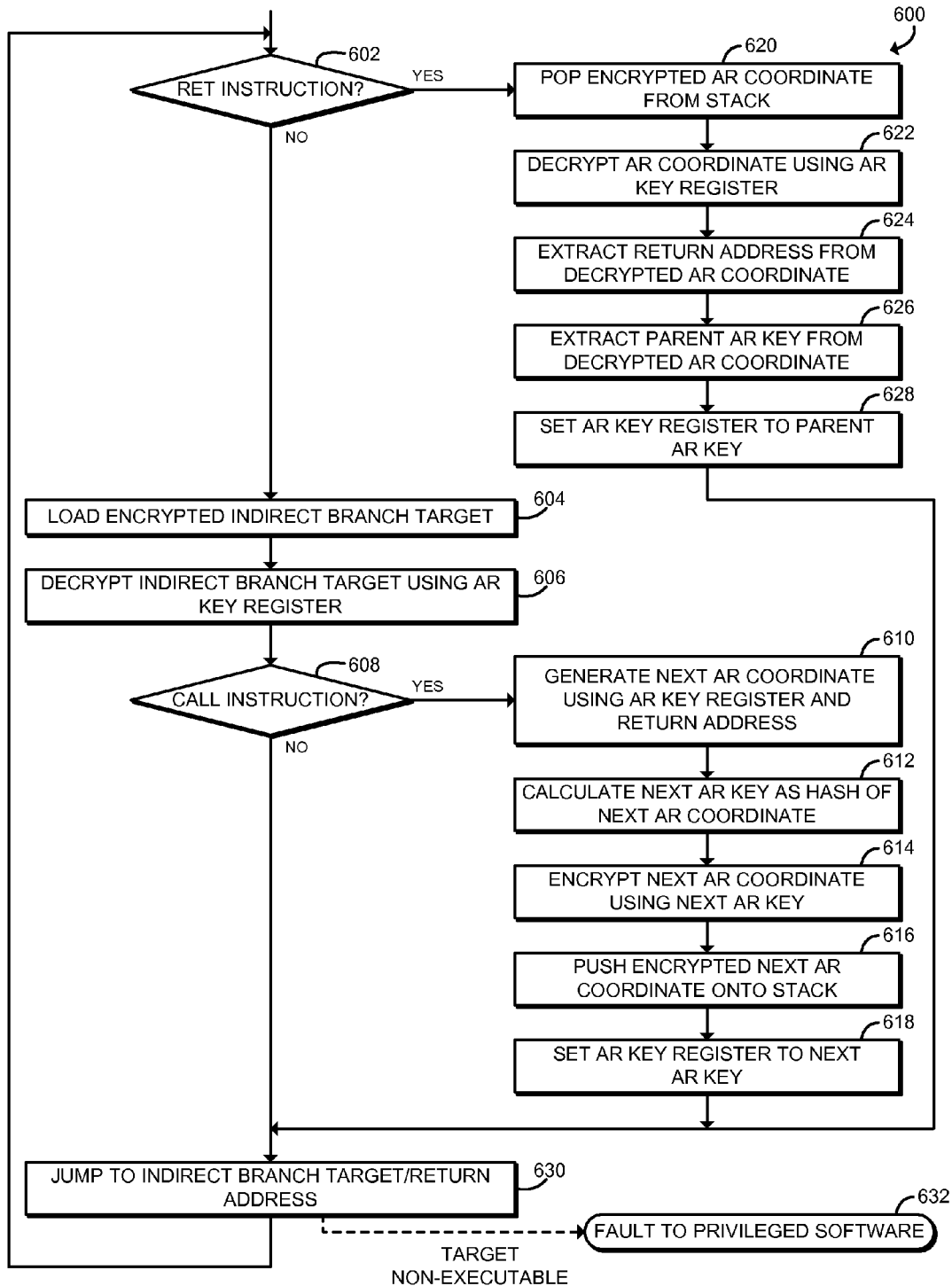
FIG. 6 is a simplified flow diagram of at least one embodiment of a method for executing an indirect branch instruction with activation record authorization that may be executed by the computing device of FIGS. 1 and 2.

Referring now to FIG. 6, in use, the computing device 100 may execute a method 600 for executing an indirect branch instruction with activation record authorization. The indirect branch instruction may be embodied as any instruction causing a change of control flow that depends on a variable value such as a memory location or a register, for example a conditional jump instruction, unconditional jump instruction, call instruction, or return instruction. The method 600 may be executed by hardware of the processor 120, such as by activation record authorization support 124. The method 600 begins in block 602, in which the computing device 100 determines whether the indirect branch instruction is a return instruction (e.g., a RET instruction). If so, the method 600 branches to block 620, described below. If the indirect branch instruction is not a return instruction, the method 600 advances to block 604.

In block 604, the computing device 100 loads the encrypted indirect branch target of the indirect branch instruction. The indirect branch target corresponds to a memory address of the next instruction to be executed by the processor 120 (i.e., a new instruction pointer value for the processor 120). As described further below, the encrypted indirect branch target has been encrypted using the activation record key of the activation record authorized to use that indirect branch target. The computing device 100 may load the encrypted indirect branch target by loading a memory location, loading a register, performing an arithmetic operation, or any combination of those operations.

In block 606, the computing device 100 decrypts the encrypted indirect branch target using the activation record key stored in the activation record key register 126 of the processor 120. The activation record key register 126 contains the activation record key of the current activation record; that is, the activation record that has most recently been added to the system call stack. If the current activation record has been authorized to branch to the indirect branch target, then decrypting the encrypted indirect branch target produces the indirect branch target. If the current activation record has not been authorized, then decrypting the encrypted indirect branch target does not produce the indirect branch target and instead produces an essentially random number. The computing device 100 may decrypt the encrypted indirect branch target using any appropriate encryption algorithm that resists known-plaintext attacks.

In block 608, the computing device 100 determines whether the current indirect branch instruction is a call instruction. A call instruction invokes a new function, method, or other procedure and thus adds another activation record to the system call stack. If the current indirect branch instruction is not a call instruction, the method 600 branches ahead to block 630, described below. If the current indirect branch instruction is a call instruction, the method 600 advances to block 610.

In block 610, the computing device 100 generates the next activation record coordinate using the activation record key register 126 and the return address associated with the indirect branch instruction. The return address may be, for example, the next instruction following the indirect branch instruction. For typical call instructions that invoke a function or method, the return address is a valid destination for an indirect branch instruction (e.g., a return instruction). Thus, the activation record for the newly-invoked function (the next activation record) should be authorized to branch to the return address. The activation record coordinate includes a representation of all of the ancestors of the activation record (its lineage) and also includes the return address for the activation record. In the illustrative embodiment, the lineage of the activation record may be embodied as the activation record key, which, as further described below, is based on activation record key of the parent activation record. Thus, the next activation record coordinate may be generated by concatenating the activation record key of the current activation record with the return address of the next activation record, as shown below in Equation 1. The lineage value used for the bottom-most activation record in the system call stack may be randomly generated by the privileged software 214, as shown below in Equation 2. The activation record coordinate may be embodied as a 64-bit value that includes the 16-bit activation record key in its upper bits and the lower 48 bits of the return address in its lower bits. In such embodiments, the activation record coordinate may be legacy-compatible with architectures that have 48-bit address spaces but store pointers as 64-bit values, such as the Intel® 64 architecture. Of course in some embodiments, the activation record coordinate may include a different number of bits, including more than 64 bits.

$$\text{Coordinate}_i = \text{Key}_{i-1} \| \text{Return}_i \quad (1)$$

$$\text{Coordinate}_0 = \text{Random} \| \text{Return}_0 \quad (2)$$

In block 612, the computing device 100 calculates the next activation record key as a hash function of the next activation record coordinate. In the illustrative embodiment, the next activation record key is calculated as a 16-bit hash value. Equation 3 illustrates calculation of the next activation record key as a hash function of the next activation record coordinate. Because the next activation record coordinate includes the current activation record key, as described above, the next activation record key includes an indication of the activation record's lineage.

$$\text{Key}_i = \text{hash}(\text{Coordinate}_i) \quad (3)$$

In block 614, the computing device 100 encrypts the next activation record coordinate using the next activation record key to generate the encrypted next activation record coordinate. As described above, the computing device 100 may use any encryption scheme that is resistant to known-plaintext attacks, because the return address will become known after branching to the return address. The encrypted next activation record coordinate may occupy the same amount of space as a native return address; for example, the encrypted next activation record coordinate may be embodied as a 64-bit value in the Intel® 64 architecture.

In block 616, the computing device 100 pushes the encrypted next activation record coordinate onto the system stack. In the illustrative embodiment, the encrypted next activation record coordinate occupies the same amount of space on the system stack as an ordinary return address and thus may be legacy-compatible with certain existing software and/or hardware. In block 618, the computing device 100 sets the activation record key register 126 to the next activation record key. Thus, after adjusting the activation record key register 126, the next activation record will be authorized to perform a branch to the return address. The method 600 proceeds to block 630, described below.

Referring back to block 602, if the indirect branch instruction is a return instruction, the method 600 branches to block 620. In block 620, the computing device 100 pops the encrypted activation record coordinate off of the system calls stack. As described above, the encrypted activation record coordinate was generated and pushed onto the call stack by a previous call instruction.

In block 622, the computing device 100 decrypts the encrypted activation record coordinate using the activation record key stored in the activation record key register 126. In block 624, the computing device 100 extracts the return address from the decrypted activation record coordinate. In the illustrative embodiment, the lower 48 bits of the activation record coordinate include the return address. A 64-bit return address value may be generated, for example, by sign-extending the lower 48 bits of the activation record coordinate.

In block 626, the computing device 100 extracts the parent activation record key from the decrypted activation record coordinate. In the illustrative embodiment, the parent activation record key is stored as a 16-bit value in the upper 16 bits of the activation record coordinate. In block 628, the computing device 100 sets the activation record key register 126 to the parent activation record key, which may allow the parent activation record to perform authorized indirect branch instructions. The method 600 proceeds to block 630.

In block 630, the computing device 100 jumps to the indirect branch target and/or return address determined previously. For return instructions, the computing device 100 jumps to the return address extracted from the activation record coordinate as described above in connection with block 624. For other instructions (e.g., call or jump instructions), the computing device 100 jumps to the decrypted indirect branch target as described above in connection with block 606. If the current activation record was authorized to branch to the indirect branch target or the return address, then that memory address was decrypted successfully, and the computing device jumps to that memory address as normal. After performing the jump, the method 600 loops back to block 602 to perform additional indirect branch instructions.

However, if the current activation record was not authorized to branch to the indirect branch target or return address, then that memory address was, with some probability, not decrypted successfully. The computing device 100 may perform a jump to a memory address corresponding to whatever value was produced by attempting to decrypt a value using the wrong key, which is essentially a random number. Such a jump may result in a jump to a non-executable memory location. In many embodiments having a sparse process memory map, most of the potential memory addresses may be non-executable. There is some probability that the correct key was used to decrypt the memory address.

If the computing device 100 attempts to jump to a non-executable memory address, the method 600 branches to block 632, in which the computing device 100 generates a fault to the privileged software 214. The fault may be embodied as any interrupt, exception, fault, VMexit, hypercall, system call, or other signal that may be received by or otherwise handled by the privileged software 214. In response to handling the fault, the privileged software 214 may perform one or more security operations. For example, the privileged software 214 may terminate unprivileged software 222 executed by the computing device 100, log a security violation, notify one or more users, and/or perform any other appropriate security operation. In some embodiments, the computing device 100 may perform one or more heuristic checks to determine whether the branch from an unauthorized activation record was caused by malicious software or by some legitimate software. For example, the computing device 100 may perform one or more heuristic checks as described in the co-pending U.S. patent application Ser. No. 14/498,075, Hardware Shadow Stack Support for Legacy Guests. In some embodiments, the computing device 100 may resume the unprivileged software 222 after handling the fault, for example by updating the activation record key register 126 to include the proper activation record key. Additionally, although illustrated as generating a fault to the privileged software 214, in other embodiments the processor 120 may generate an interrupt or other mechanism of invoking security software at the same privilege level as the software being protected. After faulting to privileged software, the method 600 is completed.

Figure 7:
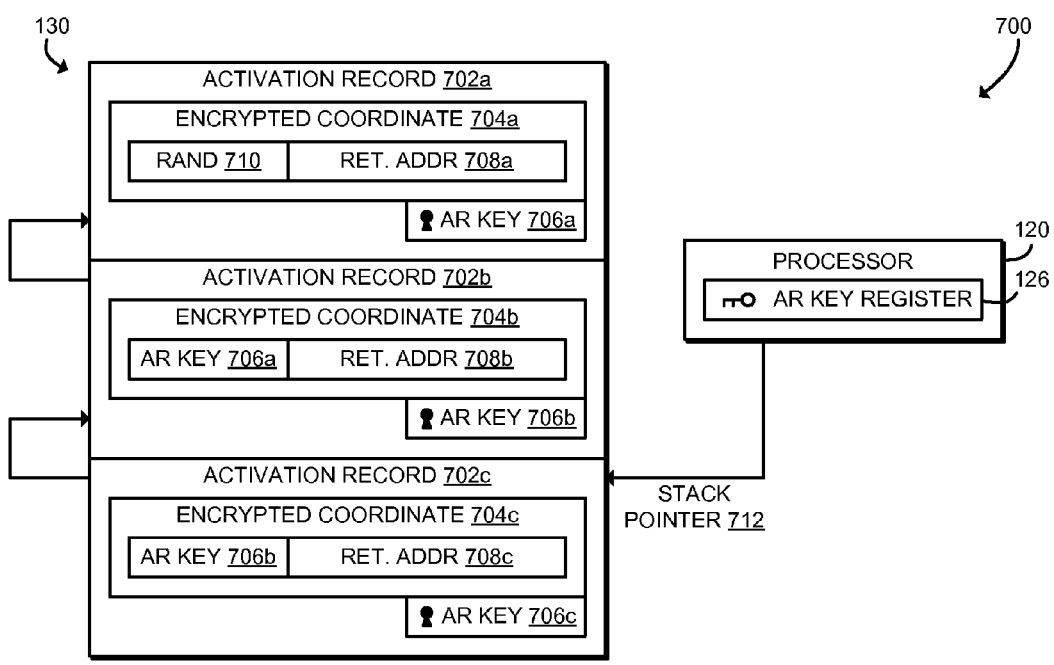
FIG. 7 is a schematic diagram of one embodiment of activation records that may be maintained by the computing device of FIGS. 1 and 2.

Referring now to FIG. 7, a schematic diagram 700 illustrates one potential embodiment of activation records, activation record coordinates, and activation record keys stored at runtime in the memory 130. In the illustrative example, the memory 130 includes a system call stack including three activation records 702a, 702b, and 702c. As illustrated, each activation record 702 includes an encrypted activation record coordinate 704. Each encrypted activation record coordinate 704 has been encrypted by an activation record key 706. Each activation record coordinate includes an activation record key 706 (or, for the first activation record 702a, a random or predetermined value 710) and a return address 708. Of course, each activation record 702 may also include other data such as passed parameters, automatic variables, or stack frame pointers.

As shown, the activation records 702a, 702b, 702c are arranged as a stack in the memory 130. A stack pointer 712 of the processor 120, which may be embodied as a specialized register, points to the activation record 702c, which is at the top of the stack and thus is the active activation record 702. The activation record key register 126 thus includes the activation record key 706c corresponding to the activation record 702c, and may be used to decrypt the encrypted activation record coordinate 704c. Decrypting the encrypted activation record coordinate 704c produces the activation record key 706b and the return address 708c. The activation record key 706b may be used to decrypt the encrypted activation record coordinate 704b, which in turn produces the activation record key 706a and the return address 708b. The activation record key 706a may be used to decrypt the encrypted activation record coordinate 704a, which in turn produces the random or predetermined value 710 (which may be known to the privileged software 214 or the unprivileged software 222 if allowable) and the return address 708a. Although illustrated as including three activation records 702, it should be understood that the system call stack may include any number of activation records 702.

Figure 8:
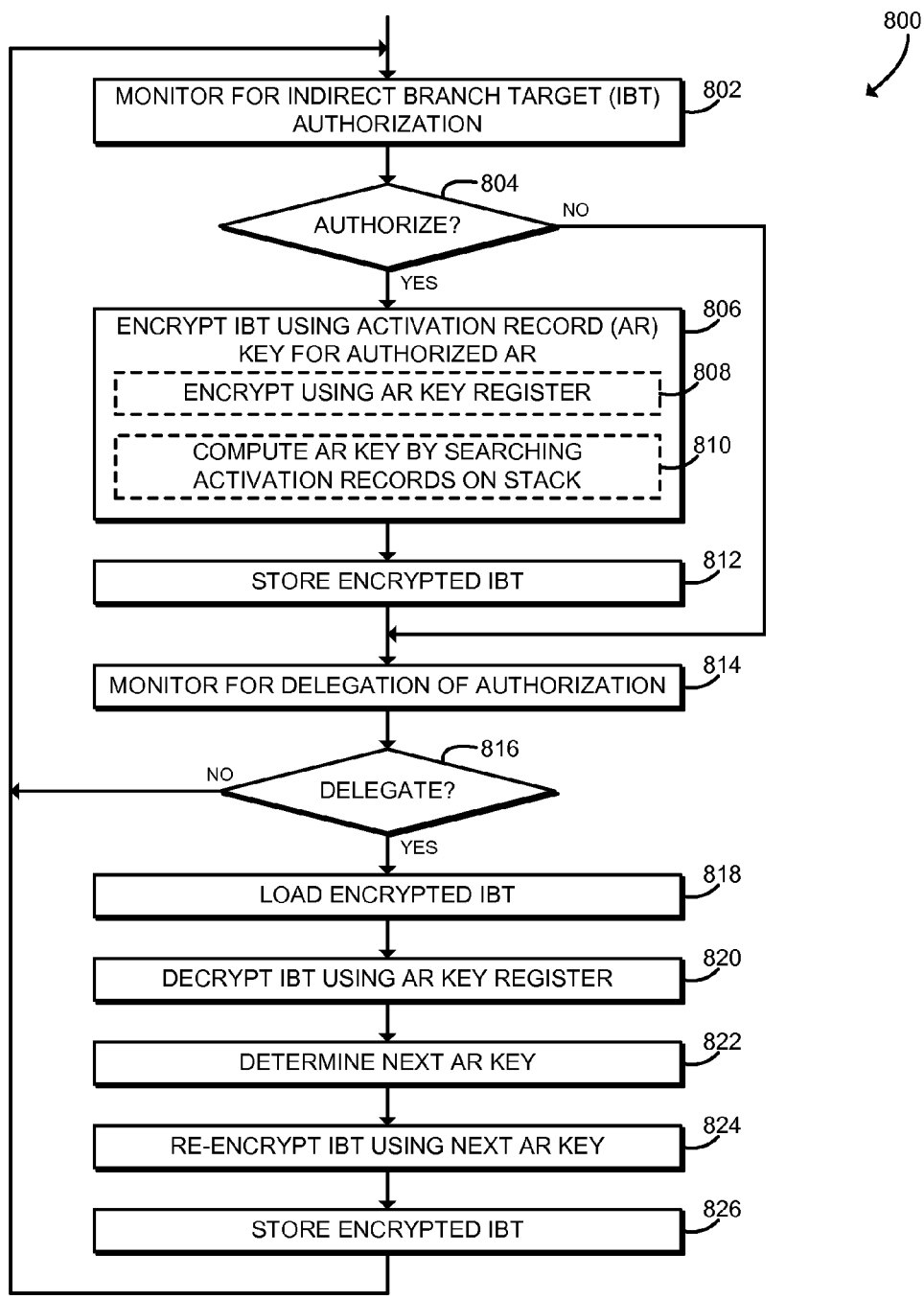
FIG. 8 is a simplified flow diagram of at least one embodiment of a method for managing activation record authorization that may be executed by the computing device of FIGS. 1 and 2.

Referring now to FIG. 8, in use, the computing device 100 may execute a method 800 for managing activation record authorization. The method 800 may be executed by the privileged software 214, by the processor 120, or by any appropriate combination of hardware and software of the computing device 100. The method 800 begins in block 802, in which the computing device 100 monitors for an authorization of an indirect branch target in the memory 130. The indirect branch target may correspond to any valid entry point for executable code, and may be embodied as, for example, the entry point for a function, a method, a procedure, a case block of a switch statement, or any other valid code block. The indirect branch target may be authorized, for example, by loading an executable program, loading a dynamic library, opening or resolving a function, setting a variable (e.g., setting the control variable of a switch statement), or otherwise enabling a valid entry point for executable code. Monitoring for authorization may be performed by, for example, the privileged software 214 of the computing device 100 or the unprivileged software 222 if allowable. In block 804, the computing device 100 determines whether an indirect branch target is being authorized. If not, the method 800 branches ahead to block 814, described below. If an indirect branch target is being initialized, the method 800 advances to block 806.

In block 806, the computing device 100 encrypts the address of the indirect branch target using the activation record key of the authorized activation record. As described above in connection with FIG. 7, during an indirect branch instruction, the processor 120 may decrypt the encrypted indirect branch target using the value of the activation record key register 126. Thus, the indirect branch target may be successfully used only by the authorized activation record. The computing device 100 may use any technique for identifying the authorized activation record. In some embodiments, in block 808 the computing device 100 may encrypt the indirect branch target using the activation record key stored in the activation record key register 126. Thus, in those embodiments the current activation record may be authorized to use the indirect branch target.

In some embodiments, in block 810, the computing device 100 may compute the activation record key for the authorized activation record by searching the system call stack for a particular activation record. The privileged software 214 may be capable of deriving the activation record key with high probability for any activation record included in the system call stack. For example, in the illustrative embodiments, the privileged software 214 may read a 64-bit value from the top of the stack and decrypt that 64-bit value to generate a candidate activation record coordinate. The privileged software 214 may hash the candidate activation record coordinate to generate a candidate activation record key. If the candidate activation record key matches the current activation key, then the candidate activation record coordinate corresponds to the current activation record. If the candidate activation record key does not match the current activation key, then the privileged software may read another 64-bit value from further down the stack (e.g., by incrementing a pointer by one byte) and continue the search. Once the current activation record coordinate is found, the parent activation record key may be extracted from the current activation record, and the privileged software 214 may continue searching the system call stack for the parent activation record coordinate. The privileged software 214 may continue until activation record coordinates and activation record keys are identified for all ancestors of the current activation record. In some embodiments, the privileged software 214 may begin its search beyond the current top of the system call stack, for example to determine if software has skipped part of the system call stack. Additionally, the search may only succeed if software does not overwrite relevant activation record coordinates on the system call stack.

In block 812, the computing device 100 stores the encrypted indirect branch target in place of the indirect branch target. For example, the encrypted indirect branch target may be stored at a location in the memory 130 or in a register of the processor 120. After being stored, future indirect branch instructions may load the encrypted indirect branch target rather than the indirect branch target itself.

In block 814, the computing device 100 monitors for a delegation of an activation record authorization to another authorization record. The privileged software 214, the unprivileged software 222 if allowable, and/or the processor 120 may support specialized instructions, commands, or functions to allow an activation record to delegate its authorization to a child authorization record. The instruction to delegate the authorization may specify the indirect branch target to be authorized, as well as the return address of the child activation record to be authorized. In block 816, the computing device 100 determines whether an authorization is being delegated. If not, the method 800 loops back to block 802 to continue managing activation record authorization. If an authorization is being delegated, the method 800 advances to block 818.

In block 818, the computing device 100 loads the specified encrypted indirect branch target. As described above, the encrypted indirect branch target has been encrypted using the activation record key of the activation record authorized to use that indirect branch target. The computing device 100 may load the encrypted indirect branch target by loading a memory location, loading a register, performing an arithmetic operation, or any combination of those operations.

In block 820, the computing device 100 decrypts the encrypted indirect branch target using the activation record key stored in the activation record key register 126 of the processor 120. The activation record key register 126 contains the activation record key of the current activation record; that is, the activation record that has most recently been added to the system call stack or to which the most recent function or method return was directed. As described above, if the current activation record has been authorized to use the indirect branch target, decrypting the encrypted indirect branch target will be successful.

In block 822, the computing device 100 determines the next activation record key. As described above, the next activation record key is determined as a hash of the next activation record coordinate. The next activation record coordinate is produced by concatenating a representation of the lineage of the next activation record and the return address of the next activation record. In the illustrative embodiment, the lineage of the next activation record may be represented by the activation record key of the current activation record.

In block 824, the computing device 100 re-encrypts the indirect branch target with the next activation record key to generate an encrypted indirect branch target. As described above, the computing device 100 may use any encryption scheme that is resistant to known-plaintext attacks. In block 826, the computing device 100 stores the encrypted indirect branch target. For example, the encrypted indirect branch target may be stored at a location in the memory 130 or in a register of the processor 120. After being stored, the next activation record (e.g., a child activation record of the current activation record) may be authorized to use the indirect branch target. After delegating the authorization, the method 800 loops back to block 802 to continue managing activation record authorization.

EXAMPLES

Illustrative examples of the technologies disclosed herein are provided below. An embodiment of the technologies may include any one or more, and any combination of, the examples described below.

Example 1 includes a computing device for executing an indirect branch instruction, the computing device comprising an indirect branch target module to determine an indirect branch target of the indirect branch instruction, load a memory tag associated with a holder of the indirect branch target; determine whether the memory tag associated with the holder of the indirect branch target is set; and generate a security fault in response to a determination that the memory tag is not set.

Example 2 includes the subject matter of Example 1, and wherein the indirect branch target module is further to perform a jump to the indirect branch target in response to a determination the memory tag is set.

Example 3 includes the subject matter of any of Examples 1 and 2, and wherein the indirect branch target module is further to determine whether the indirect branch instruction is a call instruction; and set a second memory tag associated with a holder of a return address of the call instruction in response to a determination that the indirect branch instruction is a call instruction and in response to a determination that the memory tag is set.

Example 4 includes the subject matter of any of Examples 1-3, and wherein the indirect branch target module is further to determine whether the indirect branch instruction is a return instruction; and clear the memory tag associated with a holder of the indirect branch target in response to a determination that the indirect branch instruction is a return instruction and in response to a determination that the memory tag is set.

Example 5 includes the subject matter of any of Examples 1-4, and further including a security module to perform, by privileged software of the computing device, a security operation in response to generation of the security fault.

Example 6 includes the subject matter of any of Examples 1-5, and further including a tag memory, wherein the tag memory is not accessible to unprivileged software of the computing device, and wherein to load the memory tag associated with the holder of the indirect branch target comprises to load the memory tag from the tag memory.

Example 7 includes the subject matter of any of Examples 1-6, and wherein the tag memory comprises a dedicated memory other than a main memory of the computing device.

Example 8 includes the subject matter of any of Examples 1-7, and wherein the tag memory comprises a part of a main memory of the computing device.

Example 9 includes the subject matter of any of Examples 1-8, and wherein to determine the indirect branch target comprises to store the indirect branch target in a first register of a processor of the computing device; and to load the memory tag associated with the holder of the indirect branch target comprises to load the memory tag from a tag register of the processor of the computing device, wherein the tag register is associated with the first register and is not accessible to unprivileged software of the computing device.

Example 10 includes the subject matter of any of Examples 1-9, and wherein to load the memory tag associated with the holder of the indirect branch target comprises to fault to privileged software to load the memory tag.

Example 11 includes the subject matter of any of Examples 1-10, and further including a write-monitoring module to detect a memory store to the holder of the indirect branch target; and clear the memory tag associated with the holder of the indirect branch target in response to detection of the memory store.

Example 12 includes the subject matter of any of Examples 1-11, and further including a processor, wherein the processor comprises the write-monitoring module.

Example 13 includes the subject matter of any of Examples 1-12, and wherein the write-monitoring module is further to mark the holder of the indirect branch target as non-writable, and generate a fault in response to the memory store to the holder of the indirect branch target; wherein to detect the memory store comprises to detect the fault by privileged software of the computing device; and to clear the memory tag comprises to clear the memory tag by the privileged software.

Example 14 includes the subject matter of any of Examples 1-13, and further including a tagged memory copy module to copy data from the holder of the indirect branch target to a second memory address; and store the memory tag associated with the holder of the indirect branch target to a tag memory of the computing device associated with the second memory address in response to copying of the data, wherein the tag memory is not accessible to unprivileged software of the computing device.

Example 15 includes the subject matter of any of Examples 1-14, and wherein to store the memory tag comprises to copy the memory tag from a tag register of a processor of the computing device.

Example 16 includes the subject matter of any of Examples 1-15, and further including a processor, wherein the processor comprises the tagged memory copy module; and to copy the data from the holder of the indirect branch target to the second memory address comprises to copy the data in response to a tagged memory copy instruction executed by the processor of the computing device.

Example 17 includes the subject matter of any of Examples 1-16, and further including a branch target initialization module to set, by privileged software of the computing device, the memory tag associated with the holder of the indirect branch target.

Example 18 includes the subject matter of any of Examples 1-17, and wherein to set the memory tag comprises to command the indirect branch module to set the memory tag.

Example 19 includes the subject matter of any of Examples 1-18, and wherein to set the memory tag comprises to write the memory tag into a tag memory of the computing device, wherein the tag memory is not accessible to unprivileged software of the computing device.

Example 20 includes a computing device for executing an indirect branch instruction, the computing device comprising a processor comprising an activation record key register; and an indirect branch target module to: (i) load an encrypted indirect branch target, (ii) decrypt the encrypted indirect branch target using an activation record key stored in the activation record key register to generate an indirect branch target, (iii) and perform a jump to the indirect branch target.

Example 21 includes the subject matter of Example 20, and wherein the activation record key register is not accessible to unprivileged software of the computing device.

Example 22 includes the subject matter of any of Examples 20 and 21, and wherein the indirect branch module is further to determine whether the indirect branch instruction is a return instruction; and to load the encrypted indirect branch target comprises to pop an encrypted activation record coordinate from a call stack of the computing device in response to a determination that the indirect branch instruction is a return instruction.

Example 23 includes the subject matter of any of Examples 20-22, and wherein to decrypt the encrypted indirect branch target comprises, in response to the determination that the indirect branch instruction is a return instruction, to decrypt the encrypted activation record coordinate using the activation record key stored in the activation record key register to generate an activation record coordinate; extract a return address from the activation record coordinate, wherein the indirect branch target comprises the return address; extract a parent activation record key from the activation record coordinate; and set the activation record key register to the parent activation record key.

Example 24 includes the subject matter of any of Examples 20-23, and wherein to extract the return address comprises to extract a lower 48 bits of the activation record coordinate.

Example 25 includes the subject matter of any of Examples 20-24, and wherein to extract the parent activation record key comprises to extract an upper 16 bits of the activation record coordinate.

Example 26 includes the subject matter of any of Examples 20-25, and wherein the indirect branch target module is further to determine whether the indirect branch instruction is a call instruction; generate, in response to a determination that the indirect branch instruction is a call instruction, a next activation record coordinate as a function of the activation record key stored in the activation record key register and a return address of the call instruction; determine a next activation record key as a hash function of the next activation record coordinate; encrypt the next activation record coordinate using the next activation record key to generate an encrypted next activation record coordinate; and push the encrypted next activation record onto a call stack of the computing device.

Example 27 includes the subject matter of any of Examples 20-26, and wherein the indirect branch target module is further to set the activation record key register to the next activation record key.

Example 28 includes the subject matter of any of Examples 20-27, and wherein to generate the next activation record coordinate comprises to concatenate the activation record key and a lower 48 bits of the return address.

Example 29 includes the subject matter of any of Examples 20-28, and wherein to determine the next activation record key comprises to calculate a 16-bit hash value of the next activation record coordinate.

Example 30 includes the subject matter of any of Examples 20-29, and wherein the indirect branch target module is to generate a security fault in response to performance of the jump to the indirect branch target, wherein the indirect branch target is marked as non-executable; and the computing device further comprises a security module to perform, by privileged software of the computing device, a security operation in response to generation of the security fault.

Example 31 includes the subject matter of any of Examples 20-30, and further including an activation record authorization delegation module to load a delegator encrypted indirect branch target; decrypt the delegator encrypted indirect branch target using a delegator activation record key to generate the indirect branch target; and encrypt the indirect branch target using the activation record key to generate the encrypted indirect branch target.

Example 32 includes the subject matter of any of Examples 20-31, and further including an activation record authorization management module to encrypt, by privileged software of the computing device, the indirect branch target using the activation record key to generate the encrypted indirect branch target; and store, by the privileged software, the encrypted indirect branch target.

Example 33 includes the subject matter of any of Examples 20-32, and further including an activation record authorization management module to identify, by privileged software of the computing device, a first activation record coordinate of an active activation record, wherein to identify the first activation record coordinate comprises to search a call stack of the computing device using the activation record key stored in the activation record key register.

Example 34 includes the subject matter of any of Examples 20-33, and wherein to search the call stack using the activation record key stored in the activation record key register comprises to read a first data value from a first position in the call stack; decrypt the first data value using the activation record key stored in the activation record key register to generate a first candidate activation record coordinate; determine a candidate activation record key as a hash function of the first candidate activation record coordinate; determine whether the activation record key stored in the activation record key register matches the candidate activation record key; and increment the first position in the call stack in response to a determination that the activation record key stored in the activation record key register does not match the candidate activation record key.

Example 35 includes the subject matter of any of Examples 20-34, and wherein to identify the first activation record coordinate of the active activation record comprises to identify the first activation record coordinate in response to a determination that the activation record key stored in the activation record key register matches the candidate activation record key.

Example 36 includes the subject matter of any of Examples 20-35, and wherein the activation record authorization management module is further to extract, by the privileged software, a parent activation record key from the first activation record coordinate in response to identification of the first activation record coordinate; and identify, by the privileged software, a second activation record coordinate of a second active activation record, wherein to identify the second activation record coordinate comprises to search the call stack of the computing device using the parent activation record key.

Example 37 includes a method for executing an indirect branch instruction, the method comprising determining, by a computing device, an indirect branch target of the indirect branch instruction, loading, by the computing device, a memory tag associated with a holder of the indirect branch target; determining, by an indirect branch module of the computing device, whether the memory tag associated with the holder of the indirect branch target is set; and generating, by the indirect branch module, a security fault in response to determining the memory tag is not set.

Example 38 includes the subject matter of Example 37, and further including performing, by the computing device, a jump to the indirect branch target in response to determining the memory tag is set.

Example 39 includes the subject matter of any of Examples 37 and 38, and further including determining, by the computing device, whether the indirect branch instruction is a call instruction; and setting, by the indirect branch module, a second memory tag associated with a holder of a return address of the call instruction in response to determining the indirect branch instruction is a call instruction and in response to determining the memory tag is set.

Example 40 includes the subject matter of any of Examples 37-39, and further including determining, by the computing device, whether the indirect branch instruction is a return instruction in response to determining the memory tag is set; and clearing, by the indirect branch module, the memory tag associated with the holder of the indirect branch target in response to determining the indirect branch instruction is a return instruction.

Example 41 includes the subject matter of any of Examples 37-40, and further including performing, by privileged software of the computing device, a security operation in response to generating the security fault.

Example 42 includes the subject matter of any of Examples 37-41, and wherein loading the memory tag associated with the holder of the indirect branch target comprises loading the memory tag from a tag memory of the computing device, wherein the tag memory is not accessible to unprivileged software of the computing device.

Example 43 includes the subject matter of any of Examples 37-42, and wherein the tag memory comprises a dedicated memory other than a main memory of the computing device.

Example 44 includes the subject matter of any of Examples 37-43, and wherein the tag memory comprises a part of a main memory of the computing device.

Example 45 includes the subject matter of any of Examples 37-44, and wherein determining the indirect branch target comprises storing the indirect branch target in a first register of a processor of the computing device; and loading the memory tag associated with the holder of the indirect branch target comprises loading the memory tag from a tag register of the processor of the computing device, wherein the tag register is associated with the first register and is not accessible to unprivileged software of the computing device.

Example 46 includes the subject matter of any of Examples 37-45, and wherein loading the memory tag associated with the holder of the indirect branch target comprises faulting to privileged software to load the memory tag.

Example 47 includes the subject matter of any of Examples 37-46, and wherein loading the memory tag associated with the indirect branch target comprises loading the memory tag by the indirect branch module.

Example 48 includes the subject matter of any of Examples 37-47, and further including detecting, by the computing device, a memory store to the holder of the indirect branch target; and clearing, by the computing device, the memory tag associated with the holder of the indirect branch target in response to detecting the memory store.

Example 49 includes the subject matter of any of Examples 37-48, and wherein detecting the memory store comprises detecting the memory store by the indirect branch module; and clearing the memory tag comprises clearing the memory tag by the indirect branch module.

Example 50 includes the subject matter of any of Examples 37-49, and further including marking, by the computing device, the holder of the indirect branch target as non-writable, and generating, by the computing device, a fault in response to the memory store to the holder of the indirect branch target; wherein detecting the memory store comprises detecting the fault by privileged software of the computing device; and clearing the memory tag comprises clearing the memory tag by the privileged software.

Example 51 includes the subject matter of any of Examples 37-50, and further including copying, by the computing device, data from the holder of the indirect branch target to a second memory address; and storing, by the indirect branch module, the memory tag associated with the holder of the indirect branch target to a tag memory of the computing device associated with the second memory address in response to copying the data, wherein the tag memory is not accessible to unprivileged software of the computing device.

Example 52 includes the subject matter of any of Examples 37-51, and wherein storing the memory tag comprises copying the memory tag from a tag register of a processor of the computing device.

Example 53 includes the subject matter of any of Examples 37-52, and wherein copying the data from the holder of the indirect branch target to the second memory address comprises copying the data by the indirect branch module in response to a tagged memory copy instruction executed by a processor of the computing device.

Example 54 includes the subject matter of any of Examples 37-53, and further including setting, by privileged software of the computing device, the memory tag associated with the holder of the indirect branch target.

Example 55 includes the subject matter of any of Examples 37-54, and wherein setting the memory tag comprises commanding the indirect branch module to set the memory tag.

Example 56 includes the subject matter of any of Examples 37-55, and wherein setting the memory tag comprises writing the memory tag into a tag memory of the computing device, wherein the tag memory is not accessible to unprivileged software of the computing device.

Example 57 includes a method for executing an indirect branch instruction, the method comprising loading, by an indirect branch target module of a processor of a computing device, an encrypted indirect branch target; decrypting, by the indirect branch target module, the encrypted indirect branch target using an activation record key stored in an activation record key register of the processor to generate an indirect branch target; and performing, by the computing device, a jump to the indirect branch target.

Example 58 includes the subject matter of Example 57, and wherein the activation record key register is not accessible to unprivileged software of the computing device.

Example 59 includes the subject matter of any of Examples 57 and 58, and further including determining, by the computing device, whether the indirect branch instruction is a return instruction, wherein loading the encrypted indirect branch target comprises popping an encrypted activation record coordinate from a call stack of the computing device in response to determining the indirect branch instruction is a return instruction.

Example 60 includes the subject matter of any of Examples 57-59, and wherein decrypting the encrypted indirect branch target comprises, in response to determining the indirect branch instruction is a return instruction decrypting the encrypted activation record coordinate using the activation record key stored in the activation record key register to generate an activation record coordinate; extracting a return address from the activation record coordinate, wherein the indirect branch target comprises the return address; extracting a parent activation record key from the activation record coordinate; and setting the activation record key register to the parent activation record key.

Example 61 includes the subject matter of any of Examples 57-60, and wherein extracting the return address comprises extracting a lower 48 bits of the activation record coordinate.

Example 62 includes the subject matter of any of Examples 57-61, and wherein extracting the parent activation record key comprises extracting an upper 16 bits of the activation record coordinate.

Example 63 includes the subject matter of any of Examples 57-62, and further including determining, by the computing device, whether the indirect branch instruction is a call instruction; generating, by the indirect branch target module and in response to determining that the indirect branch instruction is a call instruction, a next activation record coordinate as a function of the activation record key stored in the activation record key register and a return address of the call instruction; determining, by the indirect branch target module, a next activation record key as a hash function of the next activation record coordinate; encrypting, by the indirect branch target module, the next activation record coordinate using the next activation record key to generate an encrypted next activation record coordinate; and pushing, by the indirect branch target module, the encrypted next activation record onto a call stack of the computing device.

Example 64 includes the subject matter of any of Examples 57-63, and further including setting, by indirect branch target module, the activation record key register to the next activation record key.

Example 65 includes the subject matter of any of Examples 57-64, and wherein generating the next activation record coordinate comprises concatenating the activation record key and a lower 48 bits of the return address.

Example 66 includes the subject matter of any of Examples 57-65, and wherein determining the next activation record key comprises calculating a 16-bit hash value of the next activation record coordinate.

Example 67 includes the subject matter of any of Examples 57-66, and further including generating, by the indirect branch target module, a security fault in response to performing the jump to the indirect branch target, wherein the indirect branch target is marked as non-executable; and performing, by privileged software of the computing device, a security operation in response to generating the security fault.

Example 68 includes the subject matter of any of Examples 57-67, and further including loading, by the computing device, a delegator encrypted indirect branch target; decrypting, by the computing device, the delegator encrypted indirect branch target using a delegator activation record key to generate the indirect branch target; and encrypting, by the computing device, the indirect branch target using the activation record key to generate the encrypted indirect branch target.

Example 69 includes the subject matter of any of Examples 57-68, and further including encrypting, by privileged software of the computing device, the indirect branch target using the activation record key to generate the encrypted indirect branch target; and storing, by the privileged software of the computing device, the encrypted indirect branch target.

Example 70 includes the subject matter of any of Examples 57-69, and further including identifying, by privileged software of the computing device, a first activation record coordinate of an active activation record by searching a call stack of the computing device using the activation record key stored in the activation record key register.

Example 71 includes the subject matter of any of Examples 57-70, and wherein searching the call stack using the activation record key stored in the activation record key register comprises reading a first data value from a first position in the call stack; decrypting the first data value using the activation record key stored in the activation record key register to generate a first candidate activation record coordinate; determining a candidate activation record key as a hash function of the first candidate activation record coordinate; determining whether the activation record key stored in the activation record key register matches the candidate activation record key; and incrementing the first position in the call stack in response to determining the activation record key stored in the activation record key register does not match the candidate activation record key.

Example 72 includes the subject matter of any of Examples 57-71, and wherein identifying the first activation record coordinate of the active activation record comprises identifying the first activation record coordinate in response to determining the activation record key stored in the activation record key register matches the candidate activation record key.

Example 73 includes the subject matter of any of Examples 57-72, and further including extracting, by the privileged software, a parent activation record key from the first activation record coordinate in response to identifying the first activation record coordinate; and identifying, by the privileged software, a second activation record coordinate of a second active activation record by searching the call stack of the computing device using the parent activation record key.

Example 74 includes a computing device comprising a processor; and a memory having stored therein a plurality of instructions that when executed by the processor cause the computing device to perform the method of any of Examples 37-73.

Example 75 includes one or more machine readable storage media comprising a plurality of instructions stored thereon that in response to being executed result in a computing device performing the method of any of Examples 37-73.

Example 76 includes a computing device comprising means for performing the method of any of Examples 37-73.

Example 77 includes a computing device for executing an indirect branch instruction, the computing device comprising means for determining an indirect branch target of the indirect branch instruction, means for loading a memory tag associated with a holder of the indirect branch target; means for determining, by an indirect branch module of the computing device, whether the memory tag associated with the holder of the indirect branch target is set; and means for generating, by the indirect branch module, a security fault in response to determining the memory tag is not set.

Example 78 includes the subject matter of Example 77, and further including means for performing a jump to the indirect branch target in response to determining the memory tag is set.

Example 79 includes the subject matter of any of Examples 77 and 78, and further including means for determining whether the indirect branch instruction is a call instruction; and means for setting, by the indirect branch module, a second memory tag associated with a holder of a return address of the call instruction in response to determining the indirect branch instruction is a call instruction and in response to determining the memory tag is set.

Example 80 includes the subject matter of any of Examples 77-79, and further including means for determining whether the indirect branch instruction is a return instruction in response to determining the memory tag is set; and means for clearing, by the indirect branch module, the memory tag associated with the holder of the indirect branch target in response to determining the indirect branch instruction is a return instruction.

Example 81 includes the subject matter of any of Examples 77-80, and further including means for performing, by privileged software of the computing device, a security operation in response to generating the security fault.

Example 82 includes the subject matter of any of Examples 77-81, and wherein the means for loading the memory tag associated with the holder of the indirect branch target comprises means for loading the memory tag from a tag memory of the computing device, wherein the tag memory is not accessible to unprivileged software of the computing device.

Example 83 includes the subject matter of any of Examples 77-82, and wherein the tag memory comprises a dedicated memory other than a main memory of the computing device.

Example 84 includes the subject matter of any of Examples 77-83, and wherein the tag memory comprises a part of a main memory of the computing device.

Example 85 includes the subject matter of any of Examples 77-84, and wherein the means for determining the indirect branch target comprises means for storing the indirect branch target in a first register of a processor of the computing device; and the means for loading the memory tag associated with the holder of the indirect branch target comprises means for loading the memory tag from a tag register of the processor of the computing device, wherein the tag register is associated with the first register and is not accessible to unprivileged software of the computing device.

Example 86 includes the subject matter of any of Examples 77-85, and wherein the means for loading the memory tag associated with the holder of the indirect branch target comprises means for faulting to privileged software to load the memory tag.

Example 87 includes the subject matter of any of Examples 77-86, and wherein the means for loading the memory tag associated with the indirect branch target comprises means for loading the memory tag by the indirect branch module.

Example 88 includes the subject matter of any of Examples 77-87, and further including means for detecting a memory store to the holder of the indirect branch target; and means for clearing the memory tag associated with the holder of the indirect branch target in response to detecting the memory store.

Example 89 includes the subject matter of any of Examples 77-88, and wherein the means for detecting the memory store comprises means for detecting the memory store by the indirect branch module; and the means for clearing the memory tag comprises means for clearing the memory tag by the indirect branch module.

Example 90 includes the subject matter of any of Examples 77-89, and further including means for marking the holder of the indirect branch target as non-writable, and means for generating a fault in response to the memory store to the holder of the indirect branch target; wherein the means for detecting the memory store comprises means for detecting the fault by privileged software of the computing device; and the means for clearing the memory tag comprises means for clearing the memory tag by the privileged software.

Example 91 includes the subject matter of any of Examples 77-90, and further including means for copying data from the holder of the indirect branch target to a second memory address; and means for storing the memory tag associated with the holder of the indirect branch target to a tag memory of the computing device associated with the second memory address in response to copying the data, wherein the tag memory is not accessible to unprivileged software of the computing device.

Example 92 includes the subject matter of any of Examples 77-91, and wherein the means for storing the memory tag comprises means for copying the memory tag from a tag register of a processor of the computing device.

Example 93 includes the subject matter of any of Examples 77-92, and wherein the means for copying the data from the holder of the indirect branch target to the second memory address comprises means for copying the data by the indirect branch module in response to a tagged memory copy instruction executed by a processor of the computing device.

Example 94 includes the subject matter of any of Examples 77-93, and further including means for setting, by privileged software of the computing device, the memory tag associated with the holder of the indirect branch target.

Example 95 includes the subject matter of any of Examples 77-94, and wherein the means for setting the memory tag comprises means for commanding the indirect branch module to set the memory tag.

Example 96 includes the subject matter of any of Examples 77-95, and wherein the means for setting the memory tag comprises means for writing the memory tag into a tag memory of the computing device, wherein the tag memory is not accessible to unprivileged software of the computing device.

Example 97 includes a computing device for executing an indirect branch instruction, the computing device comprising means for loading, by an indirect branch target module of a processor of a computing device, an encrypted indirect branch target; means for decrypting, by the indirect branch target module, the encrypted indirect branch target using an activation record key stored in an activation record key register of the processor to generate an indirect branch target; and means for performing a jump to the indirect branch target.

Example 98 includes the subject matter of Example 97, and wherein the activation record key register is not accessible to unprivileged software of the computing device.

Example 99 includes the subject matter of any of Examples 97 and 98, and further including means for determining whether the indirect branch instruction is a return instruction, wherein the means for loading the encrypted indirect branch target comprises means for popping an encrypted activation record coordinate from a call stack of the computing device in response to determining the indirect branch instruction is a return instruction.

Example 100 includes the subject matter of any of Examples 97-99, and wherein the means for decrypting the encrypted indirect branch target comprises, in response to determining the indirect branch instruction is a return instruction means for decrypting the encrypted activation record coordinate using the activation record key stored in the activation record key register to generate an activation record coordinate; means for extracting a return address from the activation record coordinate, wherein the indirect branch target comprises the return address; means for extracting a parent activation record key from the activation record coordinate; and means for setting the activation record key register to the parent activation record key.

Example 101 includes the subject matter of any of Examples 97-100, and wherein the means for extracting the return address comprises means for extracting a lower 48 bits of the activation record coordinate.

Example 102 includes the subject matter of any of Examples 97-101, and wherein the means for extracting the parent activation record key comprises means for extracting an upper 16 bits of the activation record coordinate.

Example 103 includes the subject matter of any of Examples 97-102, and further including means for determining whether the indirect branch instruction is a call instruction; means for generating, by the indirect branch target module and in response to determining that the indirect branch instruction is a call instruction, a next activation record coordinate as a function of the activation record key stored in the activation record key register and a return address of the call instruction; means for determining, by the indirect branch target module, a next activation record key as a hash function of the next activation record coordinate; means for encrypting, by the indirect branch target module, the next activation record coordinate using the next activation record key to generate an encrypted next activation record coordinate; and means for pushing, by the indirect branch target module, the encrypted next activation record onto a call stack of the computing device.

Example 104 includes the subject matter of any of Examples 97-103, and further including means for setting, by indirect branch target module, the activation record key register to the next activation record key.

Example 105 includes the subject matter of any of Examples 97-104, and wherein the means for generating the next activation record coordinate comprises means for concatenating the activation record key and a lower 48 bits of the return address.

Example 106 includes the subject matter of any of Examples 97-105, and wherein the means for determining the next activation record key comprises means for calculating a 16-bit hash value of the next activation record coordinate.

Example 107 includes the subject matter of any of Examples 97-106, and further including means for generating, by the indirect branch target module, a security fault in response to performing the jump to the indirect branch target, wherein the indirect branch target is marked as non-executable; and means for performing, by privileged software of the computing device, a security operation in response to generating the security fault.

Example 108 includes the subject matter of any of Examples 97-107, and further including means for loading a delegator encrypted indirect branch target; means for decrypting the delegator encrypted indirect branch target using a delegator activation record key to generate the indirect branch target; and means for encrypting the indirect branch target using the activation record key to generate the encrypted indirect branch target.

Example 109 includes the subject matter of any of Examples 97-108, and further including means for encrypting, by privileged software of the computing device, the indirect branch target using the activation record key to generate the encrypted indirect branch target; and means for storing, by the privileged software of the computing device, the encrypted indirect branch target.

Example 110 includes the subject matter of any of Examples 97-109, and, further including means for identifying, by privileged software of the computing device, a first activation record coordinate of an active activation record by a means for searching a call stack of the computing device using the activation record key stored in the activation record key register.

Example 111 includes the subject matter of any of Examples 97-110, and wherein the means for searching the call stack using the activation record key stored in the activation record key register comprises means for reading a first data value from a first position in the call stack; means for decrypting the first data value using the activation record key stored in the activation record key register to generate a first candidate activation record coordinate; means for determining a candidate activation record key as a hash function of the first candidate activation record coordinate; means for determining whether the activation record key stored in the activation record key register matches the candidate activation record key; and means for incrementing the first position in the call stack in response to determining the activation record key stored in the activation record key register does not match the candidate activation record key.

Example 112 includes the subject matter of any of Examples 97-111, and wherein the means for identifying the first activation record coordinate of the active activation record comprises means for identifying the first activation record coordinate in response to determining the activation record key stored in the activation record key register matches the candidate activation record key.

Example 113 includes the subject matter of any of Examples 97-112, and further including means for extracting, by the privileged software, a parent activation record key from the first activation record coordinate in response to identifying the first activation record coordinate; and means for identifying, by the privileged software, a second activation record coordinate of a second active activation record by searching the call stack of the computing device using the parent activation record key.

The invention claimed is:

1. A computing device for indirect branch execution, the computing device comprising a processor, a tag memory, and one or more non-transitory, computer-readable storage media, wherein:
   the non-transitory, computer-readable storage media comprises an indirect branch instruction;
   the processor comprises indirect branch target logic to:
      determine an indirect branch target of the indirect branch instruction in response to execution of the indirect branch instruction by the processor;
      load a memory tag associated with a holder of the indirect branch target;
      determine whether the memory tag associated with the holder of the indirect branch target is set;
      generate a security fault in response to a determination that the memory tag is not set;
      determine whether the indirect branch instruction is a return instruction in response to the execution of the indirect branch instruction by the processor; and
      clear the memory tag associated with the holder of the indirect branch target in response to a determination that the indirect branch instruction is a return instruction and in response to a determination that the memory tag is set; and
   the tag memory is not accessible to unprivileged software of the computing device, wherein to load the memory tag associated with the holder of the indirect branch target comprises to load the memory tag from the tag memory, and wherein the tag memory comprises a part of a main memory of the computing device.

2. The computing device of claim 1, wherein the indirect branch target logic is further to:
   determine whether the indirect branch instruction is a call instruction in response to the execution of the indirect branch instruction by the processor; and
   set a second memory tag associated with a holder of a return address of the call instruction in response to a determination that the indirect branch instruction is a call instruction and in response to a determination that the memory tag is set.

3. The computing device of claim 1, wherein the one or more non-transitory, computer-readable storage media further comprise a plurality of instructions that in response to being executed by the processor cause the computing device to:
   detect a memory store to the holder of the indirect branch target; and
   clear the memory tag associated with the holder of the indirect branch target in response to detection of the memory store.

4. The computing device of claim 3, wherein:
   the one or more non-transitory, computer-readable storage media further comprise a plurality of instructions that in response to being executed by the processor cause the computing device to mark the holder of the indirect branch target as non-writable;
   the processor further comprises write-monitoring logic to generate a fault in response to the memory store to the holder of the indirect branch target;
   to detect the memory store comprises to detect the fault by privileged software of the computing device; and
   to clear the memory tag comprises to clear the memory tag by the privileged software.

5. The computing device of claim 1, wherein to load the memory tag associated with the holder of the indirect branch target comprises to fault to privileged software to load the memory tag.

6. The computing device of claim 1, wherein the one or more non-transitory, computer-readable storage media further comprise a plurality of instructions that in response to being executed by the processor cause the computing device to set, by privileged software of the computing device, the memory tag associated with the holder of the indirect branch target.

7. A method for indirect branch execution, the method comprising:
   executing, by a processor of a computer device, an indirect branch instruction;
   determining, by the processor, an indirect branch target of the indirect branch instruction in response to executing the indirect branch instruction;
   loading, by the processor, a memory tag associated with a holder of the indirect branch target from a tag memory of the computing device, wherein the tag memory is not accessible to unprivileged software of the computing device, and wherein the tag memory comprises a part of a main memory of the computing device;
   determining, by the processor, whether the memory tag associated with the holder of the indirect branch target is set;
   generating, by the processor, a security fault in response to determining the memory tag is not set;
   determining, by the processor, whether the indirect branch instruction is a return instruction in response to executing the indirect branch instruction; and
   clearing, by the processor, the memory tag associated with the holder of the indirect branch target in response to determining the indirect branch instruction is a return instruction and in response to determining the memory tag is set.

8. The method of claim 7, further comprising:
   determining, by the processor, whether the indirect branch instruction is a call instruction in response to executing the indirect branch instruction; and
   setting, by the processor, a second memory tag associated with a holder of a return address of the call instruction in response to determining the indirect branch instruction is a call instruction and in response to determining the memory tag is set.

9. The method of claim 7, further comprising:
   detecting, by the computing device, a memory store to the holder of the indirect branch target; and
   clearing, by the computing device, the memory tag associated with the holder of the indirect branch target in response to detecting the memory store.

10. The method of claim 7, wherein loading the memory tag associated with the holder of the indirect branch target comprises faulting to privileged software to load the memory tag.

11. The method of claim 9, further comprising:
    marking, by the computing device, the holder of the indirect branch target as non-writable, and
    generating, by the computing device, a fault in response to the memory store to the holder of the indirect branch target;
    wherein detecting the memory store comprises detecting the fault by privileged software of the computing device; and
    clearing the memory tag comprises clearing the memory tag by the privileged software.

* * * * *